US012723513B2

(12) United States Patent
Xie et al.

(10) Patent No.: US 12,723,513 B2
(45) **Date of Patent: *Sep. 1, 2026**

(54) ENGINE COMPONENT

(71) Applicant: General Electric Company, Evendale, OH (US)

(72) Inventors: Ming Xie, Dayton, OH (US); Arthur W. Sibbach, Boxford, MA (US); Nicholas J. Kray, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/269,134

(22) Filed: Jul. 15, 2025

(65) Prior Publication Data

US 2025/0341166 A1 Nov. 6, 2025

Related U.S. Application Data

(63) Continuation of application No. 18/654,134, filed on May 3, 2024, now Pat. No. 12,410,716.

(51) Int. Cl.
*F01D 5/14* (2006.01)
*F01D 5/22* (2006.01)
(Continued)

(52) U.S. Cl.
CPC ............. *F01D 5/147* (2013.01); *F01D 5/282* (2013.01); *F05D 2240/303* (2013.01); *F05D 2240/304* (2013.01); *F05D 2250/12* (2013.01)

(58) Field of Classification Search
CPC ......... F05D 2240/303; F05D 2240/304; F05D 2220/36; F05D 2300/603; F05D 2240/121; F05D 2220/32; F05D 2250/12; F05D 2300/133; F05D 2300/171; F05D 2240/12; F05D 2240/307; F05D 2260/36; F05D 2300/6033; F05D 2300/6032; F04D 29/324; F04D 29/023; F01D 5/147; F01D 5/282; F01D 5/288; F01D 21/045
See application file for complete search history.

(56) References Cited

U.S. PATENT DOCUMENTS 4,006,999 A 2/1977 Brantley
4,693,435 A * 9/1987 Percival .................... B64C 3/36
244/121

(Continued)

FOREIGN PATENT DOCUMENTS

CN 101153612 A 4/2008
CN 102003217 A 4/2011

(Continued)

OTHER PUBLICATIONS

Machine Translation of CN 115405564 A [retrieved on Jan. 12, 2026]. Retrieved from: Espacenet. (Year: 2026).*

*Primary Examiner* — Eric J Zamora Alvarez
(74) *Attorney, Agent, or Firm* — McGarry Bair PC

(57) ABSTRACT

An engine component for a turbine engine. The engine component has a composite structure and a cover structure. The composite structure has a composite structure outer wall, a composite structure edge, and a channel. The channel is provided along the composite structure edge. The cover encases at least a portion of the composite structure outer wall. The cover has a main body and an extension.

20 Claims, 12 Drawing Sheets

(51) Int. Cl.

| | |
|---|---|
| ***F01D 5/28*** | (2006.01) |
| ***F01D 25/24*** | (2006.01) |
| ***F04D 29/32*** | (2006.01) |
| ***F04D 29/52*** | (2006.01) |

(56) References Cited

U.S. PATENT DOCUMENTS

| | | | | |
|---|---|---|---|---|
| 5,782,607 | A | 7/1998 | Smith | |
| 5,908,285 | A | 6/1999 | Graff | |
| 7,744,346 | B2 | 6/2010 | Schreiber | |
| 8,137,073 | B2 | 3/2012 | Giusti | |
| 8,529,212 | B2 | 9/2013 | Smith | |
| 8,827,654 | B2 | 9/2014 | Schreiber | |
| 8,851,421 | B2 | 10/2014 | Jevons | |
| 9,012,824 | B2 | 4/2015 | Christou | |
| 9,376,917 | B2 | 6/2016 | Murooka | |
| 9,506,353 | B2 | 11/2016 | Schwarz | |
| 9,702,257 | B2 | 7/2017 | Yagi | |
| 10,221,718 | B2 | 3/2019 | Clarkson | |
| 10,240,463 | B2 | 3/2019 | Notarianni | |
| 10,471,556 | B2 | 11/2019 | Onfray | |
| 10,539,025 | B2 | 1/2020 | Kray | |
| 11,203,938 | B2 | 12/2021 | Kottilingam | |
| 11,333,028 | B2 | 5/2022 | Congratel | |
| 11,352,891 | B2 | 6/2022 | Barnett | |
| 11,680,489 | B2 | 6/2023 | Barnett | |
| 11,725,524 | B2 | 8/2023 | Kryj-Kos | |
| 11,920,494 | B2 | 3/2024 | Gondre | |
| 2009/0035131 | A1 | 2/2009 | McMillan | |
| 2014/0193271 | A1 | 7/2014 | Dudon | |
| 2014/0255194 | A1 | 9/2014 | Jones | |
| 2015/0026980 | A1 | 1/2015 | Tellier | |
| 2015/0086377 | A1 * | 3/2015 | Leconte | B23K 20/233 29/889.71 |
| 2015/0308276 | A1 | 10/2015 | Kleinow | |
| 2016/0032741 | A1 | 2/2016 | Perez-Duarte | |
| 2017/0226865 | A1 | 8/2017 | Kray | |
| 2017/0254207 | A1 | 9/2017 | Schetzel | |
| 2017/0268349 | A1 | 9/2017 | Bryant, Jr. | |
| 2018/0119550 | A1 | 5/2018 | Berdou | |
| 2018/0298765 | A1 | 10/2018 | Beyer | |
| 2018/0304418 | A1 | 10/2018 | Wiebe | |
| 2020/0149407 | A1 | 5/2020 | Kottilingam | |
| 2020/0208528 | A1 | 7/2020 | Delvaux | |
| 2022/0341329 | A1 | 10/2022 | Yadav | |
| 2023/0129429 | A1 | 4/2023 | Kamiya | |
| 2024/0018873 | A1 | 1/2024 | Barnett | |

FOREIGN PATENT DOCUMENTS

| | | | | |
|---|---|---|---|---|
| CN | 103052807 | A | 4/2013 | |
| CN | 108930664 | A | 12/2018 | |
| CN | 115126546 | A | 9/2022 | |
| CN | 115405564 | A * | 11/2022 | F04D 29/661 |
| CN | 115434948 | A | 12/2022 | |
| CN | 115461525 | A | 12/2022 | |
| FR | 3010132 | A1 | 3/2015 | |
| FR | 3011269 | A1 | 4/2015 | |
| FR | 3096399 | A1 | 11/2020 | |
| RU | 2350757 | C1 | 3/2009 | |
| WO | 2015191041 | A1 | 12/2015 | |

* cited by examiner

ENGINE COMPONENT

CROSS-REFERENCE TO RELATED APPLICATIONS

This application is a continuation of U.S. patent application Ser. No. 18/654,134, filed May 3, 2024, now U.S. U.S. Pat. No. 12,410,716, issued Sep. 9, 2025, which is hereby incorporated herein by reference in their entirety.

TECHNICAL FIELD

The disclosure generally relates to an engine component, and more specifically to an engine component of the turbine engine, the engine component having a composite structure.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blades and stationary vanes. The blades are mounted to rotating disks, while the vanes are mounted to stator disks.

During operation, air is brought into the compressor section through the fan section where it is then pressurized in the compressor and mixed with fuel and ignited in the combustor for generating hot combustion gases which flow downstream through the turbine stages where the air is expanded and exhausted out an exhaust section. The expansion of the air in the turbine section is used to drive the rotating sections of the fan section and the compressor section. The drawing in of air, the pressurization of the air, and the expansion of the air is done, in part, through rotation of various rotating blades mounted to respective disks throughout the fan section, the compressor section, and the turbine section, respectively. The rotation of the rotating blades imparts mechanical stresses along various portions of the blade; specifically, where the blade is mounted to the disk.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
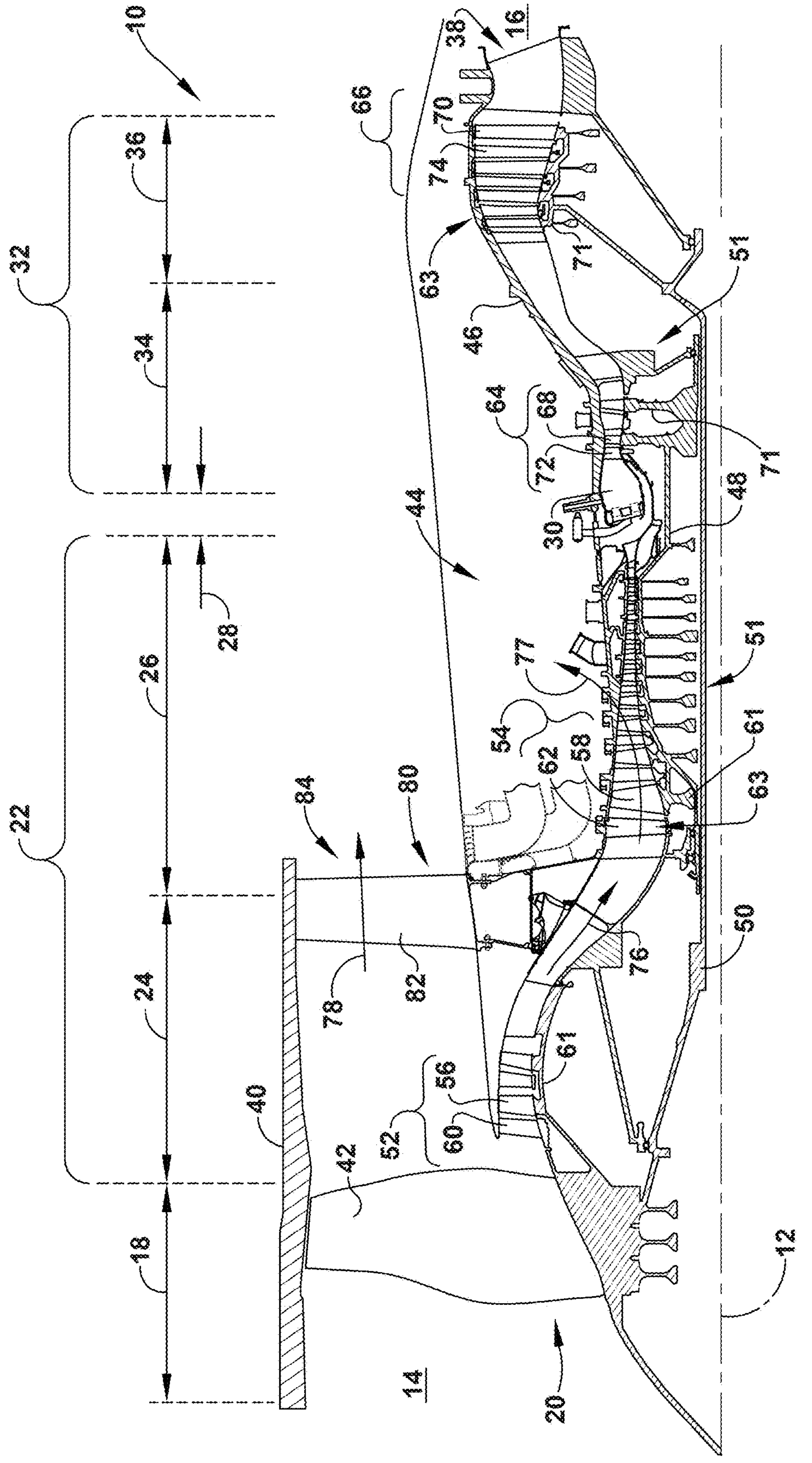
FIG. 1 is a schematic cross-sectional view of a turbine engine in accordance with an exemplary embodiment of the present disclosure.

Aspects of the disclosure herein are directed to a turbine engine including an engine component. The engine component has a composite structure and a cover structure. The cover structure includes a main body and an extension. The composite structure includes a channel. The extension is provided within the channel. The engine component is any suitable component provided within a turbine engine such as, but not limited to, an airfoil assembly, a casing (e.g., a fan casing, an engine casing, etc.), or the like.

The cover structure is used to strengthen the composite structure against external forces or otherwise from forces generated during the normal operation of the turbine engine. The cover structure can further be used coupled the composite structure to another structure of the turbine engine. For purposes of illustration, the present disclosure will be described with respect to an engine component for a turbine engine. It will be understood, however, that aspects of the disclosure described herein are not so limited and can have general applicability within other engines or within other portions of the turbine engine. For example, the disclosure can have applicability for an engine component in other engines or vehicles, and can be used to provide benefits in industrial, commercial, and residential applications.

As used herein, the term "composite structure" includes a body or an assembly that includes a composite material or collection of composite materials including, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials. The composite section of the body defines the composite structure.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "axial" and "longitudinal" both refer to a direction parallel to a centerline axis of an object, while the terms "radial" or "radially" refer to a direction that is perpendicular to the axial direction or away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be another suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

The term "composite," as used herein is, is indicative of a component having two or more materials. A composite can be a combination of at least two or more metallic, non-metallic, or a combination of metallic and non-metallic elements or materials. Examples of a composite material can be, but are not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity.

The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated. As a non-limiting example, the placement of dry fibers or matrix material can be done through automatic fiber placement (AFP) or manually by hand.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, which would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine 10 for an aircraft. The turbine engine 10 has a generally longitudinally extending axis or centerline 12 extending forward 14 to aft 16. The turbine engine 10 includes, in a downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan 20. The fan 20 includes a set of fan blades 42 disposed radially about the engine centerline 12. The HP compressor 26, the combustor 30, and the HP turbine 34 form an engine core 44 of the turbine engine 10, which generates combustion gases. The engine core 44 is surrounded by an engine casing 46, which can be coupled with the fan casing 40.

An HP shaft 48 is disposed coaxially about the engine centerline 12 of the turbine engine 10 and drivingly connects the HP turbine 34 to the HP compressor 26. An LP shaft 50, which is disposed coaxially about the engine centerline 12 of the turbine engine 10 within the larger diameter annular HP shaft 48, drivingly connects the LP turbine 36 to the LP compressor 24 and fan 20. The shafts 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, the set of compressor blades 56, 58 can be provided in a ring and can extend radially outward relative to the engine centerline 12, from a blade platform to a tip, while the corresponding static compressor vanes 60, 62 are positioned upstream of and adjacent to the set of compressor blades 56, 58. It is noted that the number of blades, vanes, and compressor stages shown in FIG. 1 were selected for illustrative purposes only, and that other numbers are possible.

The set of compressor blades 56, 58 for a stage of the compressor 24, 26 can be mounted to (or integral to) a disk 61, which is mounted to the corresponding one of the HP and LP shafts 48, 50. The static compressor vanes 60, 62 for a stage of the compressor 24, 26 can be mounted to the engine casing 46 in a circumferential arrangement.

The HP turbine 34 and the LP turbine 36 respectively include a plurality of turbine stages 64, 66, in which a set of turbine blades 68, 70 are rotated relative to a corresponding set of turbine vanes 72, 74, also referred to as a nozzle, to extract energy from the stream of fluid passing through the stage. In a single turbine stage 64, 66, the set of turbine blades 68, 70 can be provided in a ring and can extend radially outward relative to the engine centerline 12 while the corresponding set of turbine vanes 72, 74 are positioned upstream of and adjacent to the set of turbine blades 68, 70. It is noted that the number of blades, vanes, and turbine stages shown in FIG. 1 were selected for illustrative purposes only, and that other numbers are possible.

The set of turbine blades 68, 70 for a stage of the turbine can be mounted to a disk 71, which is mounted to the corresponding one of the HP and LP shafts 48, 50. The set of turbine vanes 72, 74 for a stage of the compressor can be mounted to the engine casing 46 in a circumferential arrangement.

Complementary to the rotor portion, the stationary portions of the turbine engine 10, such as the static compressor vanes 60, 62 or the set of turbine vanes 72, 74 among the compressor and turbine sections 22, 32, respectively, are also referred to individually or collectively as a stator 63. As such, the stator 63 can refer to the combination of non-rotating elements throughout the turbine engine 10.

It will be appreciated that the turbine engine 10 can be split into at least two separate portions: a rotor portion and a stator portion. The rotor portion can be defined as any portion of the turbine engine 10 that rotates about a respective rotational axis. The stator portion can be defined by a combination of non-rotating elements provided within the turbine engine 10. As a non-limiting example, the rotor portion can include one or more of the set of fan blades 42, the set of compressor blades 56, 58, or the set of turbine blades 68, 70. As a non-limiting example, the stator portion can include one or more of the set of airfoil guide vanes 82 (described below), the static compressor vanes 60, 62, or the set of turbine vanes 72, 74.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP shaft 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components for cooling. The temperature of pressurized airflow 76 entering the combustor 30 is significantly increased above the bleed air temperature. The bleed air 77 may be used to reduce the temperature of the core components downstream of the combustor 30. The bleed air 77 can also be utilized by other systems.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

A remaining portion of the airflow exiting the fan section 18, referred to as a bypass airflow 78, bypasses the LP compressor 24 and engine core 44 and exits the turbine engine 10 through a stationary vane row, and more particularly an outlet guide vane assembly 80, comprising a set of airfoil guide vanes 82, at a fan exhaust side 84. More specifically, a circumferential row of radially extending airfoil guide vanes 82 are utilized adjacent the fan section 18 to exert at least some directional control of the bypass airflow 78.

The turbine engine 10, as illustrated, is a turbofan engine. It will be appreciated, however, that the turbine engine 10 can be any suitable engine such as, but not limited to, a turboprop engine, a turboshaft engine, a ducted turbofan engine, an unducted engine, or an open rotor turbine engine. As a non-limiting example, the turbine engine 10 can be an unducted turbine engine. The unducted turbine engine includes a set of external fan blades and external fan vanes that extend radially outward from a nacelle or exterior casing that houses the engine core. The external fan blades and the external fan fans are similar in function with respect to the set of fan blades 42 and the set of airfoil guide vanes 82, respectively, of the turbine engine 10. It will be appreciated that at least a portion of the external fan blades or the external vane blades can define a radial extreme (e.g., a radially farthest portion from the engine centerline 12) in an unducted turbine engine. In other words, no portion of the turbine engine is provided radially outward from the external fan blades or external fan vanes in an unducted turbine engine.

Figure 2:
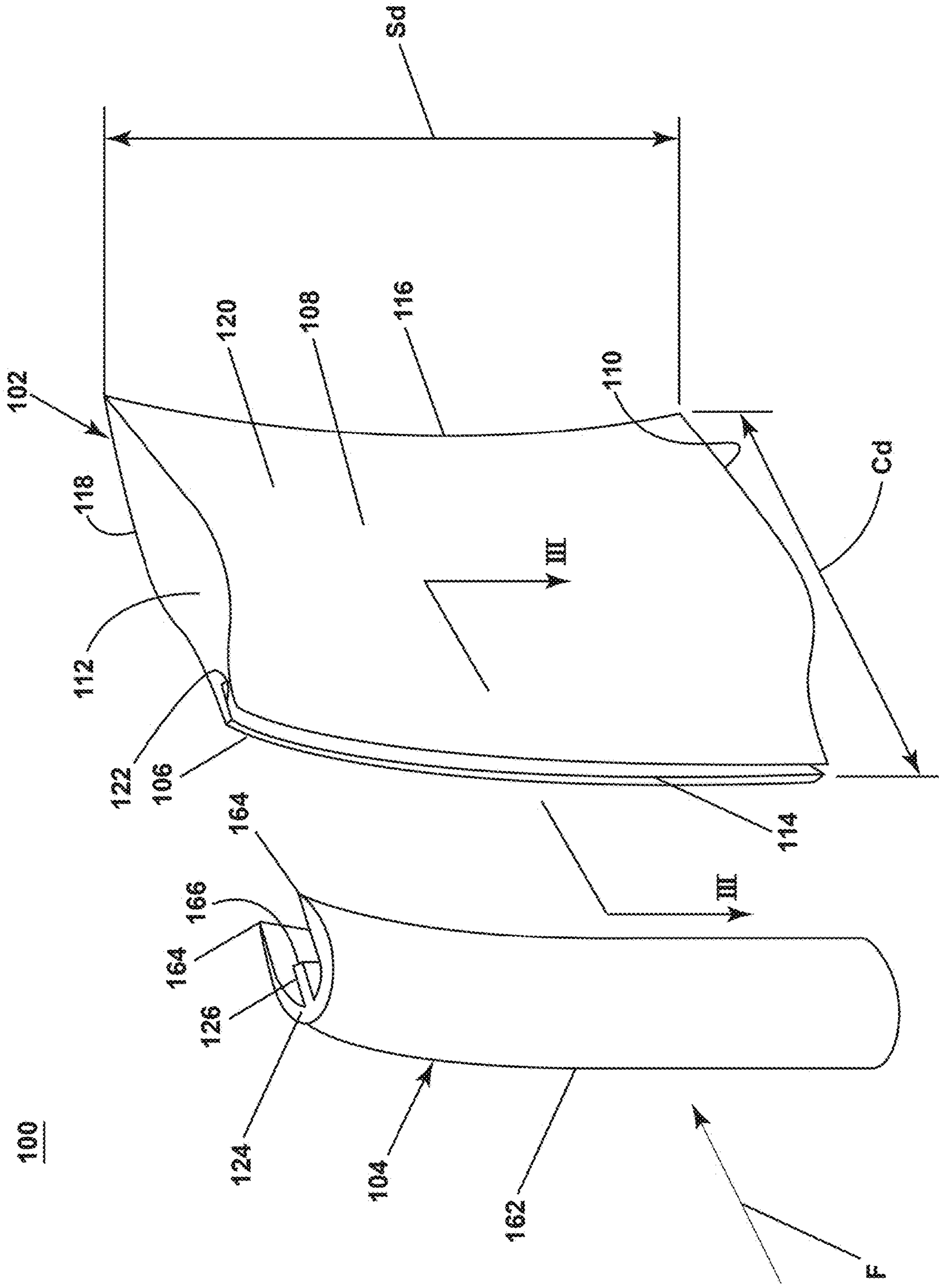
FIG. 2 is an exploded illustration of an engine component suitable for use within the turbine engine of FIG. 1, the engine component including an airfoil portion and a cover structure.

FIG. 2 is an exploded illustration of an engine component 100 suitable for use within the turbine engine 10 of FIG. 1. The engine component includes a composite structure 102 and a cover structure 104. For purposes of illustration, the cover structure 104 is exploded from the composite structure 102. The composite structure 102 can include an airfoil portion 106 such that the engine component 100 is an airfoil assembly suitable for use as a blade, vane, airfoil, or other component of any turbine engine, such as, but not limited to, a gas turbine engine, a turboprop engine, a turboshaft engine, a ducted turbofan engine, the turbine engine 10 (FIG. 1), or an unducted turbine engine. The airfoil portion 106 is any suitable airfoil of the turbine engine 10 such as, but not limited to, the set of fan blades 42 (FIG. 1), the set of airfoil guide vanes 82 (FIG. 1), the set of compressor blades 56, 58 (FIG. 1), the set of compressor vanes 60, 62 (FIG. 1), the set of turbine blades 68, 70 (FIG. 1), or the set of turbine vanes 72, 74 (FIG. 1).

The airfoil portion 106 includes a composite structure outer wall 108. The composite structure outer wall 108 extends between a composite structure leading edge 114 and a composite structure trailing edge 116 to define a chordwise direction (Cd). The composite structure outer wall 108 extends between a composite structure root 110 and a composite structure tip 112 to define a spanwise direction (Sd). The composite structure outer wall 108 defines a pressure side 120 and a suction side 118.

The composite structure 102 includes a channel 122. As a non-limiting example, the channel 122 extends along an edge of the airfoil portion 106. As a further non-limiting example, the channel 122 extends along at least one of the composite structure leading edges 114, the composite structure tip 112, the composite structure trailing edge 116, the composite structure root 110, or a combination thereof. In the illustrated example, the channel 122 extends along the composite structure leading edge 114 in the spanwise direction (Sd). It will be appreciated that the channel 122 can be segmented or continuous. The channel 122 can extend along an entirety of or less than an entirety of a respective edge of the airfoil portion 106. As a non-limiting example, the channel 122 extends along an entirety of a span (e.g., extension in the spanwise direction (Sd)) of the composite structure leading edge 114 between the composite structure root 110 and the composite structure tip 112.

At least a portion of the composite structure 102 includes a composite material. As a non-limiting example, the composite structure outer wall 108 can include a composite material. By way of non-limiting example, the composite structure outer wall 108 can include at least a PMC portion, a polymeric portion, or both. The PMC portion can include, but is not limited to, a matrix of thermoset (epoxies, phenolics) or thermoplastic (polycarbonate, polyvinylchloride, nylon, acrylics) and embedded glass, carbon, steel, or a combination thereof.

The cover structure 104 includes a main body 124 and an extension 126 extending from the main body 124. The main body 124 defines an exterior portion of the cover structure 104. The main body 124 and the extension 126 are integrally formed with or coupled to one another.

The cover structure 104 includes a cover structure edge 162, a set of main body distal ends 164, and an extension distal end 166. The cover structure edge 162, as illustrated, is a farthest forward portion of the cover structure 104 in the chordwise direction (Cd).

The total distance that the extension 126 extends in the spanwise direction (Sd) can be equal to the total distance that the main body 124 extends in the spanwise direction (Sd). The total distance that the extension 126 extends in the spanwise direction (Sd) can be different from the total distance that the main body 124 extends in the spanwise direction (Sd). As a non-limiting example, the extension 126 can extend between 75% of the composite structure leading edge 114 in the spanwise direction (Sd), while the main body 124 can extend between greater than 75% of the composite structure leading edge 114 in the spanwise direction (Sd).

The cover structure 104 includes at least one of a metallic material, a plastic material, or a combination thereof. The material of the cover structure 104 can be, but is not limited to, titanium, aluminum, polyurethane, or the like. As a non-limiting example, the cover structure 104 can include a metallic material such that the cover structure 104 is defined as a metallic cover structure.

The cover structure 104 is coupled to the composite structure 102 through any suitable coupling method such as, but not limited to, welding, adhesion, bonding, fastening, friction fit, or the like. The extension 126 is sized to fit within the channel 122. The extension 126 is received within the channel 122 when the cover structure 104 is coupled to the composite structure 102. The cover structure 104, when coupled to the composite structure 102, overlies a respective portion of the composite structure 102. Put another way, the cover structure 104 covers a respective portion of the composite structure 102.

The composite structure 102 and the cover structure 104 can be coupled to each other after assembly or formation of the composite structure 102. As a non-limiting example, the composite structure 102 and the cover structure 104 can be coupled to one another after curing the composite structure 102. The composite structure 102 and the cover structure 104 can be integrally formed with one another. As a non-limiting example, the cover structure 104 can be positioned along an uncured version of the composite structure 102. The cover structure 104 and the composite structure 102 can subsequently be co-cured such that the cover structure 104 and the composite structure 102 are integrally formed and form a unitary body. As a non-limiting example, the cover structure 104 and the composite structure 102 can be integrally formed through any suitable method such as, but not limited to, electroforming, 3D printing, or the like.

The cover structure edge 162 defines an engine component leading edge for the engine component 100. It will be appreciated, however, that the cover structure edge 162 varies based on the location where the cover structure 104 is provided. As a non-limiting example, the cover structure 104 can be provided along the composite structure trailing edge 116 to define at least a portion of an engine component trailing edge. As a non-limiting example, the cover structure can be provided along the composite structure tip 112 to define at least a portion of an engine component tip. As a non-limiting example, the cover structure can be provided along the composite structure root 110 to define at least a portion of an engine component root. As a non-limiting example, the cover structure can be provided along the composite structure outer wall 108 to define at least a portion of an engine component outer wall. It will be appreciated that the engine component 100 includes any number of one or more cover structures 104 provided along any suitable portion of the composite structure 102.

It will be appreciated that the engine component 100 is any suitable engine component 100. As a non-limiting example, the engine component 100 can be an airfoil assembly including an airfoil portion with a dovetail that extends radially inward from the root (e.g., the composite structure root 110). In such a case, the cover structure 104 can extend over or terminate prior to the dovetail portion. Additional non-limiting examples of the engine component 100 include, but are not limited to, a casing (e.g., a fan casing, a combustor liner, an engine casing, etc.), an airfoil portion including a shroud (e.g., a midspan shroud, a tip shroud, an outer platform, an inner platform, etc.), an airfoil portion extending from an inner band coupled to the root, an airfoil assembly including a spar extending from the root of the airfoil portion and being coupled to a trunnion (e.g., a variable pitch airfoil assembly), an airfoil portion coupled to a disk (e.g., the disk 61, 71 of FIG. 1), or the like.

During operation, the engine component 100 is subjected to a force (F). The force (F) is any force that may be experienced during operation of the turbine engine (e.g., the turbine engine 10 of FIG. 1). As a non-limiting example, the force (F) can be, but is not limited to, a force of an airflow flowing over the engine component 100 (e.g., the pressurized airflow 76 of FIG. 1), a rotational force exerted on the engine component 100 due to a rotation of the engine component 100, an external force applied to the engine component 100 (e.g., a bird strike), or a combination thereof. The force (F) is illustrated in the chordwise direction (Cd). The force (F) can be in any suitable direction.

The cover structure 104 is used to strengthen certain portions of the composite structure 102 (e.g., the composite structure leading edge 114) to ensure that the engine component 100 can withstand the force (F). It is contemplated that without the cover structure 104, the force (F) could damage certain portions of the composite structure 102.

Figure 3:
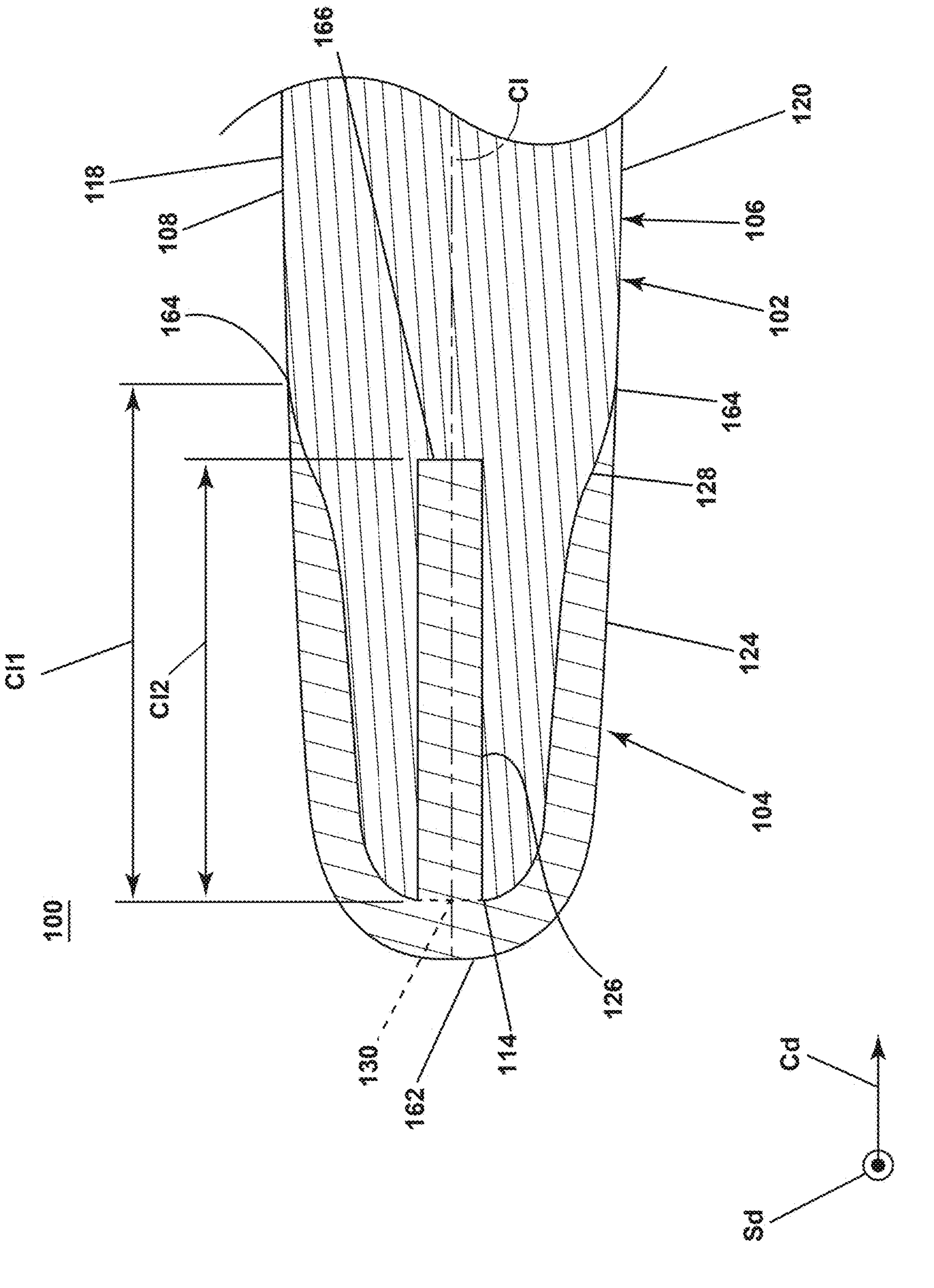
FIG. 3 is a schematic cross-sectional view of the engine component taken along sectional line III-III of FIG. 2, further illustrating a main body and an extension of the cover structure.

FIG. 3 is a schematic cross-sectional view of the engine component 100 taken along sectional line III-III of FIG. 2. The sectional line III-III is perpendicular to the spanwise direction (Sd). The sectional line III-III, while illustrated as being about halfway between the composite structure root 110 and the composite structure tip 112 can be provided at any suitable portion of the composite structure leading edge 114 inclusive of the endpoints (e.g., the composite structure tip 112 and the composite structure root 110).

The main body 124 and a respective portion of the airfoil portion 106 meet at a joint 128. The joint 128 is formed such that an exterior portion of the main body 124 extends continuously from the composite structure outer wall 108 when the cover structure 104 is coupled to the composite structure 102. Put another way, the joint 128 can be formed such that an outer surface of the cover structure 104 is flush against the composite structure outer wall 108. Alternatively, the joint 128 can be formed such that the outer surface of the cover structure 104 is recessed (e.g., radially closer to the centerline (Cl)) with respect to where the composite structure outer wall 108 at the main body distal end 164. The joint 128 is any suitable joint such as, but not limited to, a scarf joint, a butt joint, a lap joint, or the like.

The extension 126 and the main body 124 interface at a transition 130 shown in phantom lines. The extension 126 includes any suitable cross-sectional area when viewed along the sectional line III-III.

The engine component 100 includes a centerline (Cl) extending between the cover structure edge 162 and the composite structure trailing edge 116 (FIG. 2). The centerline (Cl), in terms of the engine component 100 being the airfoil assembly, is a mean camber line. It will be appreciated, however, that the centerline (Cl) is any suitable central line extending between opposing edges of the engine component 100 and being equidistant between opposing surfaces of the composite structure outer wall 108.

The extension 126 has a cross-sectional area when viewed along a plane extending along the centerline (Cl) (e.g., the sectional line III-III). The cross-sectional area, as illustrated, is rectangular. It will be appreciated, however, that the cross-sectional area is any suitable shape such as, but not limited to, circular, ovular, triangular, rectangular, hexagonal, or the like. As a non-limiting example, the cross-sectional area can be defined by an undulating (wave-like) cross-section. The extension 126 can be symmetric about the centerline (Cl). The extension 126 can be asymmetric about the centerline (Cl).

The cross-sectional area of the extension 126 can be constant or vary along an extent of the channel 122. As a non-limiting example, the cross-sectional area of the extension 126 can vary in the spanwise direction (Sd). As a non-limiting example, the cross-sectional area of the extension 126 at the composite structure root 110 (FIG. 2) can be triangular, the cross-sectional area of the extension 126 halfway between the composite structure root 110 and the composite structure tip 112 (FIG. 2) can be rectangular, while the cross-sectional area of the extension 126 at the composite structure tip 112 can be ovular.

The variation of the cross-sectional area of the extension 126 is based on the cross-sectional area of the composite structure 102 where the cover structure 104 overlays the composite structure 102 (e.g., along the composite structure leading edge 114). As a non-limiting example, the composite structure 102 can be swept along the composite structure leading edge 114 or otherwise include a non-constant cross-sectional area in the spanwise direction (Sd). These variations in the cross-sectional area of the composite structure 102 affect the formation of the extension 126. As a non-limiting example, a smaller cross-sectional area of the composite structure 102, in turn, means that the extension 126 will have to have a smaller size than areas where the composite structure has a larger cross-sectional area. Further, it is contemplated that certain shapes of the extension 126 have a better resistance to certain forces (e.g., the force (F) of FIG. 3). As a non-limiting example, if the force (F) is an external force (e.g., a bird strike), the force (F) will have a larger impact closer to the composite structure tip 112 than the composite structure root 110 in the spanwise direction (Sd). As such, the cover structure 104, specifically the extension 126, can have a more robust design (e.g., larger cross-sectional area with a larger extension 126) closer to the composite structure tip 112 than the composite structure root 110.

A farthest downstream or axially displaced main body distal end of the set of main body distal ends 164 is provided a first centerline length (Cl1) from the main body 124 at the transition 130. The main body 124 can be symmetric about the centerline (Cl). The main body 124 can be asymmetric about the centerline (Cl).

The extension 126 extends in the chordwise direction (Cd) between the transition 130 and the extension distal end 166 a second centerline length (Cl2). The first centerline length (Cl1) is greater than or equal to the second centerline length (Cl2). As a non-limiting example, the second centerline length (Cl2) is greater than or equal to 10% and less than or equal to 100% of the first centerline length (Cl1). The extension distal end 166 axially coincides with or is axially displaced from at least one main body distal end of the set of main body distal ends 164, with respect to the centerline (Cl).

It is contemplated that the selection of the second centerline length (Cl2) is used for manufacture and assembly purposes. Specifically, the shorter the second centerline length (Cl2), the easier it is to insert the extension 126 into the channel 122. Conversely, a longer second centerline length (Cl2) can cause it to be more difficult to insert the extension 126 into the channel 122. However, the shorter the second centerline length (Cl2), the smaller a mating area is between the cover structure 104 and the composite structure 102. Conversely, the longer the second centerline length (Cl2), the larger the mating area between the between the cover structure 104 and the composite structure 102 as the extension 126 is longer. As used herein, a "mating area" is defined as an available surface area between a first structure (e.g., the cover structure 104) and a second structure (e.g., the composite structure 102) that can be used to couple the two structures together. For example, when using an adhesive to couple the composite structure 102 and the cover structure 104, the available total mating area is a total surface area where the cover structure 104 directly contacts the composite structure 102. A larger mating area means a stronger bond between the cover structure 104 and the composite structure 102. The range described above (0.10Cl1≤Cl2≤Cl1) has been selected to ensure an adequate balance between the ease of manufacture and the mating area.

Figure 4:
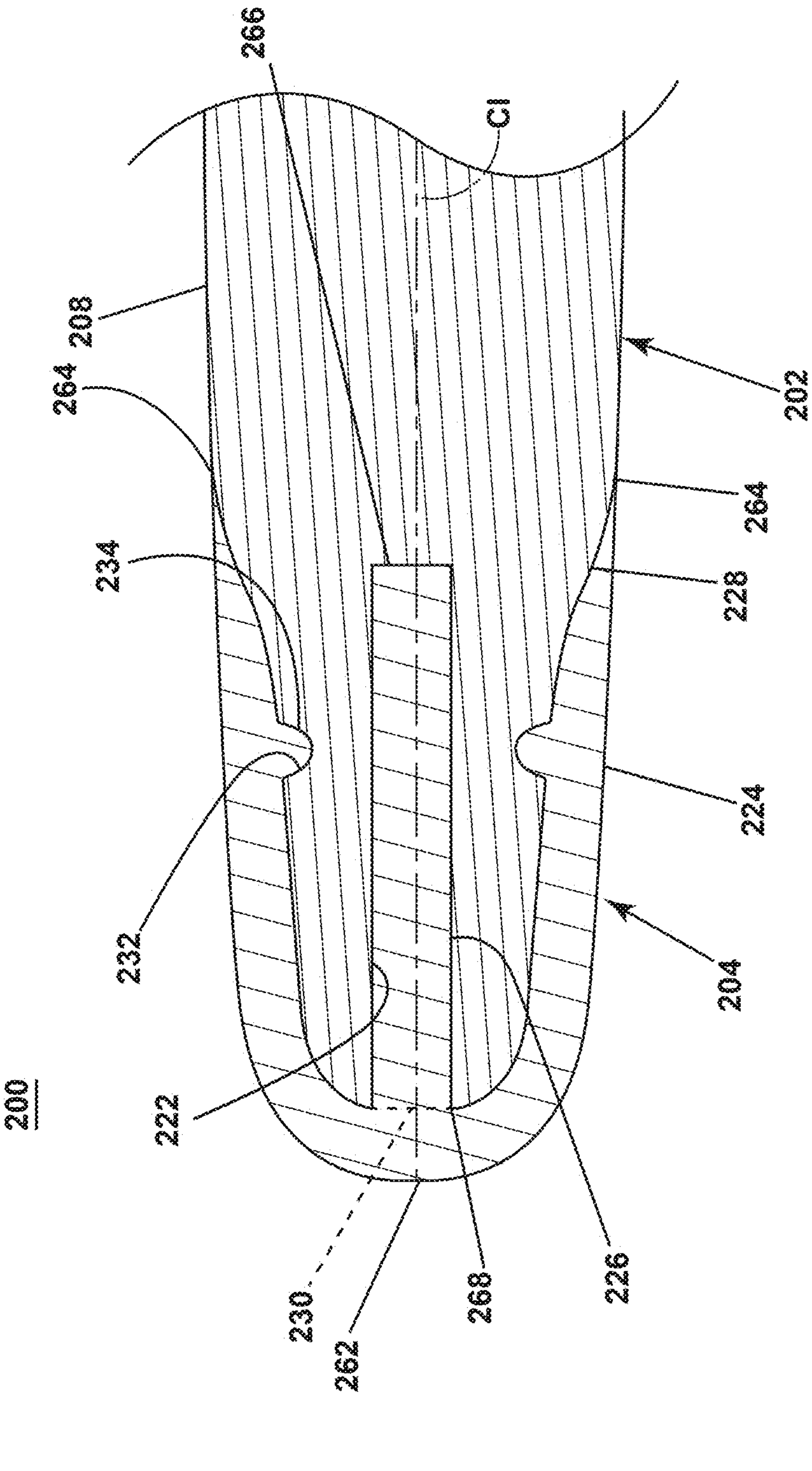
FIG. 4 is a schematic cross-sectional view of an engine component suitable for use with the engine component of FIG. 2, further illustrating a cover structure and an airfoil portion, the cover structure having a set of aligners.

FIG. 4 is a schematic cross-sectional view of an engine component 200 suitable for use with the engine component 100 of FIG. 2. The engine component 200 is similar to the engine component 100; therefore, like parts will be identified with like numerals increased to the 200 series with it being understood that the description of the engine component 100 applies to the engine component 200 unless noted otherwise.

The engine component 200 includes a composite structure 202 and a cover structure 204. The engine component 200 includes a centerline (Cl). The composite structure 202 includes a composite structure outer wall 208 and a composite structure edge 268. The composite structure edge 268 can be any suitable edge of the composite structure 202. As a non-limiting example, the composite structure edge 268 can be, but is not limited to, a composite structure tip (e.g., the composite structure tip 112 of FIG. 2), a composite structure root (e.g., the composite structure root 110 of FIG. 2), a composite structure leading edge (e.g., the composite structure leading edge 114 of FIG. 2), a composite structure trailing edge (e.g., the composite structure trailing edge 116 of FIG. 2), or the like. A channel 222 is formed along the composite structure edge 268. The composite structure 202 is any suitable composite structure such as, but not limited to, an airfoil portion (e.g., the airfoil portion 106 of FIG. 2), a fan casing (e.g., the fan casing 40 of FIG. 1), a shroud, or the like. The cover structure 204 includes a main body 224 and an extension 226. The extension 226 meets the main body 224 at a transition 230 illustrated in phantom lines. The cover structure 204 includes a cover structure edge 262, a set of main body distal ends 264, and an extension distal end 266. The cover structure 204 and the composite structure 202 meet at a joint 228.

The engine component 200 is similar to the engine component 100 in that the cover structure 204 is coupled to the composite structure 202. The cover structure 204 is provided along the composite structure edge 268 and overlies at least a portion of the composite structure outer wall 208. The engine component 200, however, further includes a set of alignment channels 232 and a set of aligners 234. Each aligner of the set of aligners 234 are sized to fit within a respective aligner channel of the set of alignment channels 232, as illustrated. The set of aligners 234 and the set of alignment channels 232 are used to align, or otherwise couple the cover structure 204 to the composite structure 202 in a desired fashion or location. The set of aligners 234 and the set of alignment channels 232 are further used as locks. Put another way, once the set of aligners 234 are provided within the set of alignment channels 232, the cover structure 204 is locked to or otherwise coupled to the composite structure 202. The extension 226, the set of aligners 234, and the set of alignment channels 232 collectively couple the cover structure 204 to the composite structure 202.

The set of aligners 234 are provided on one of either the cover structure 204 or the composite structure 202, while the set of alignment channels 232 are provided on an other of the cover structure 204 or the composite structure 202. As a non-limiting example, the set of aligners 234 are provided along the main body 224 and the set of alignment channels 232 are provided along the composite structure outer wall 208. It will be appreciated, however, that the cover structure 204 and the composite structure 202 can each include both one or more respective aligners of the set of aligners 234 and one or more respective alignment channels of the set of alignment channels 232.

Each aligner of the set of aligners 234 includes a respective cross-sectional area. The respective cross-sectional area of each aligner of the set of aligners 234 is any suitable shape such as, but not limited to, rectangular, circular, ovular, triangular, barbed, or the like.

Figure 5:
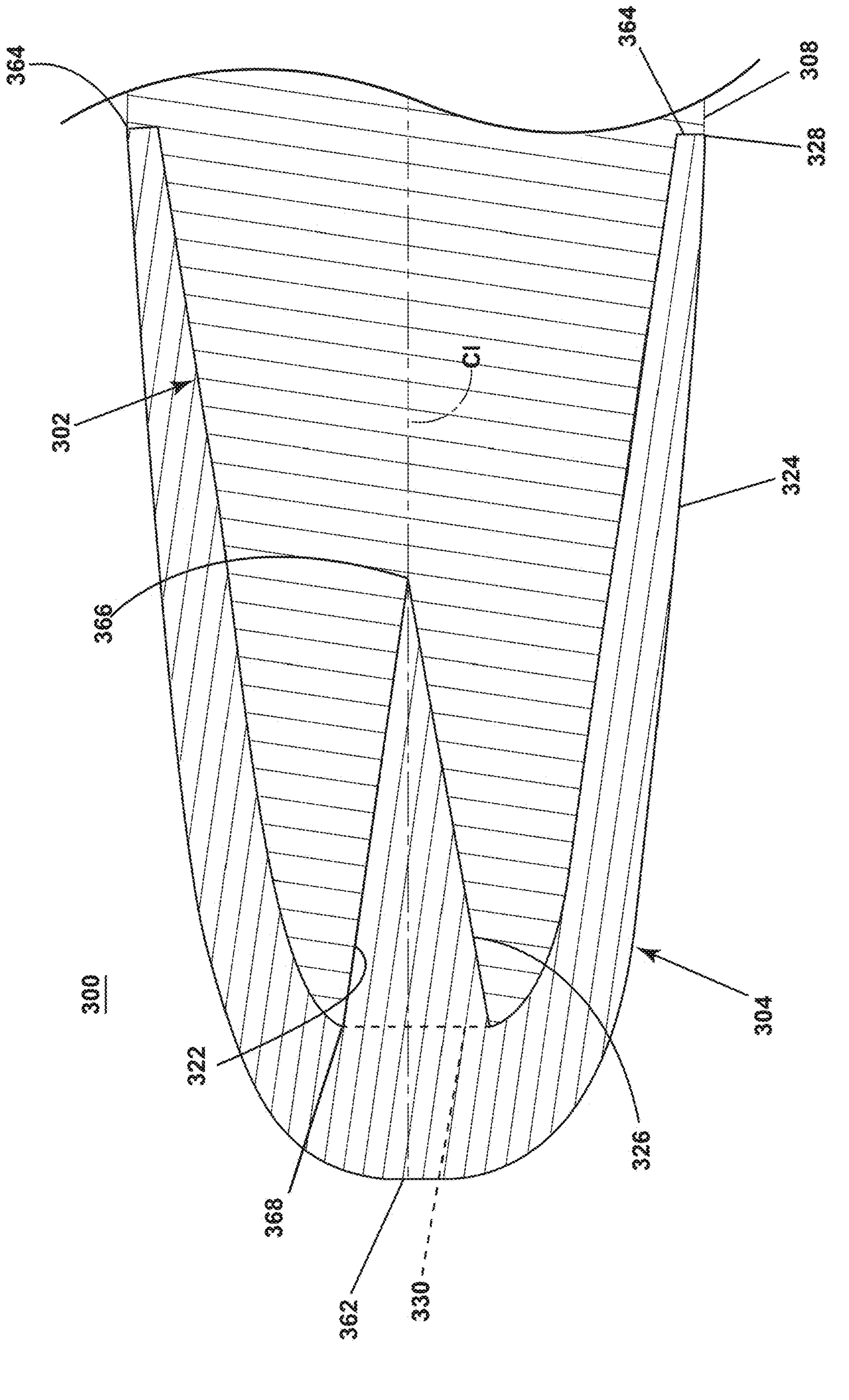
FIG. 5 is a schematic cross-sectional view of an engine component suitable for use with the engine component of FIG. 2, further illustrating an extension having a triangular shape.

FIG. 5 is a schematic cross-sectional view of an engine component 300 suitable for use with the engine component 100 of FIG. 2. The engine component 300 is similar to the engine component 100, 200 (FIG. 4); therefore, like parts will be identified with like numerals increased to the 300 series with it being understood that the description of the engine component 100, 200 applies to the engine component 300 unless noted otherwise.

The engine component 300 includes a composite structure 302 and a cover structure 304. The engine component 300 includes a centerline (Cl). The composite structure 302 includes a composite structure outer wall 308 and a composite structure edge 368. The composite structure edge 368 can be any suitable edge of the composite structure 302. As a non-limiting example, the composite structure edge 368 can be, but is not limited to, a composite structure tip (e.g., the composite structure tip 112 of FIG. 2), a composite structure root (e.g., the composite structure root 110 of FIG. 2), a composite structure leading edge (e.g., the composite structure leading edge 114 of FIG. 2), a composite structure trailing edge (e.g., the composite structure trailing edge 116 of FIG. 2), or the like. A channel 322 is formed along the composite structure edge 368. The composite structure 302 is any suitable composite structure such as, but not limited to, an airfoil portion (e.g., the airfoil portion 106 of FIG. 2), a fan casing (e.g., the fan casing 40 of FIG. 1), a shroud, or the like. The cover structure 304 includes a main body 324 and an extension 326. The extension 326 meets the main body 324 at a transition 330 illustrated in phantom lines. The cover structure 304 includes a cover structure edge 362, a set of main body distal ends 364, and an extension distal end 366. The cover structure 304 and the composite structure 302 meet at a joint 328.

The engine component 300 is similar to the engine component 100, 200 in that the cover structure 304 is coupled to the composite structure 302. The cover structure 304 is provided along the composite structure edge 368 and overlies at least a portion of the composite structure outer wall 308. The extension 326, however, includes a triangular cross-sectional area. The joint 328 is a butt joint as opposed to a scarf joint like the joint 128 (FIG. 3). The joint 328 can be sized such that the main body 324 and the composite structure outer wall 308 form a continuous surface, as illustrated.

Figure 6:
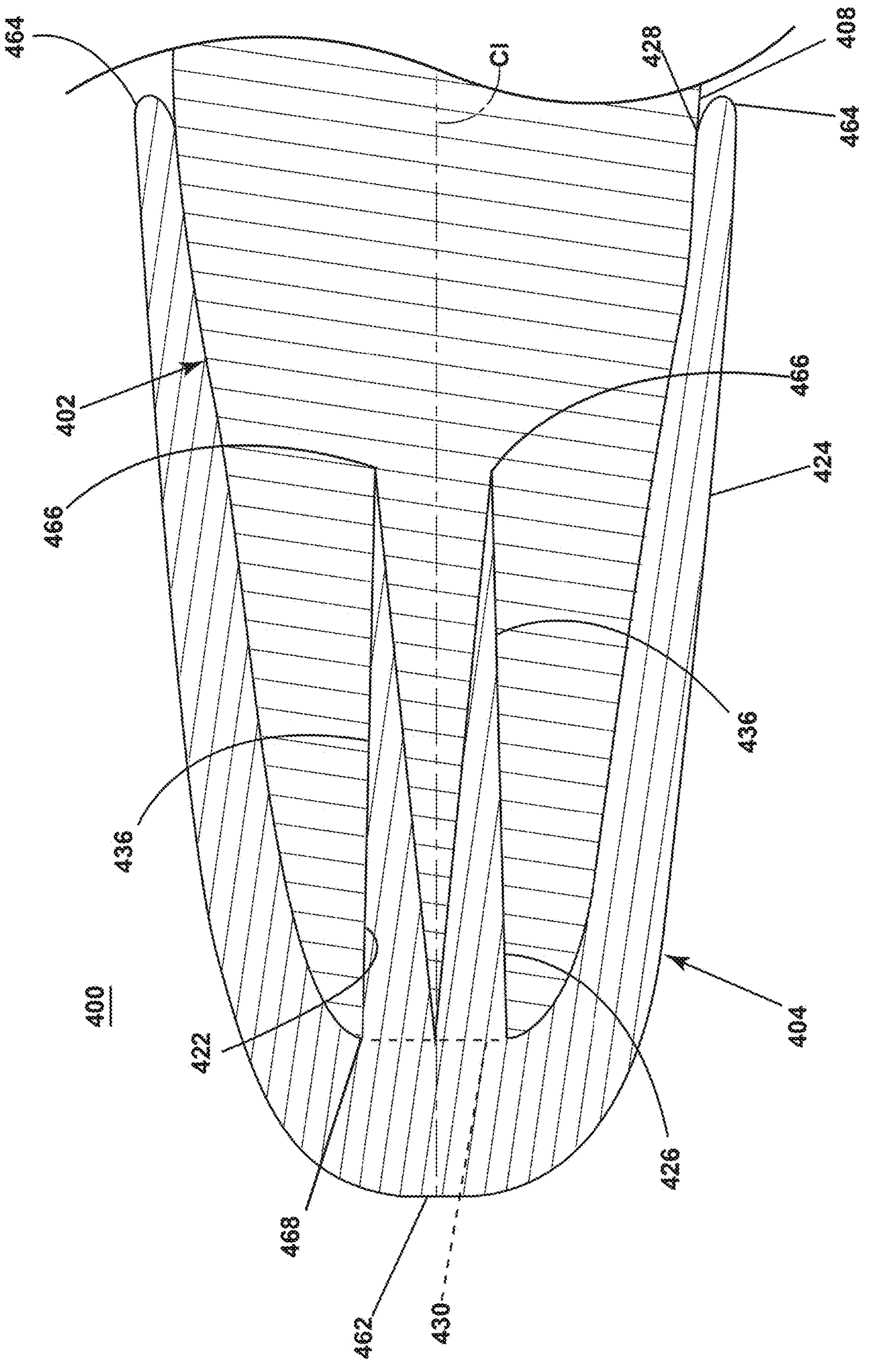
FIG. 6 is a schematic cross-sectional view of an engine component suitable for use with the engine component of FIG. 2, further illustrating an extension that is bifurcated.

FIG. 6 is a schematic cross-sectional view of an engine component 400 suitable for use with the engine component 100 of FIG. 2 The engine component 400 is similar to the engine component 100, 200 (FIG. 4), 300 (FIG. 5); therefore, like parts will be identified with like numerals increased to the 400 series with it being understood that the description of the engine component 100, 200, 300 applies to the engine component 400 unless noted otherwise.

The engine component 400 includes a composite structure 402 and a cover structure 404. The engine component 400 includes a centerline (Cl). The composite structure 402 includes a composite structure outer wall 408 and a composite structure edge 468. The composite structure edge 468 can be any suitable edge of the composite structure 402. As a non-limiting example, the composite structure edge 468 can be, but is not limited to, a composite structure tip (e.g., the composite structure tip 112 of FIG. 2), a composite structure root (e.g., the composite structure root 110 of FIG. 2), a composite structure leading edge (e.g., the composite structure leading edge 114 of FIG. 2), a composite structure trailing edge (e.g., the composite structure trailing edge 116 of FIG. 2), or the like. A channel 422 is formed along the composite structure edge 468. The composite structure 402 is any suitable composite structure such as, but not limited to, an airfoil portion (e.g., the airfoil portion 106 of FIG. 2), a fan casing (e.g., the fan casing 40 of FIG. 1), a shroud, or the like. The cover structure 404 includes a main body 424 and an extension 426. The extension 426 meets the main body 424 at a transition 430 illustrated in phantom lines. The cover structure 404 includes a cover structure edge 462, a set of main body distal ends 464, and an extension distal end 466. The cover structure 404 and the composite structure 402 meet at a joint 428.

The engine component 400 is similar to the engine component 100, 200, 300 in that the cover structure 404 is coupled to the composite structure 402. The cover structure 404 is provided along the composite structure edge 468 and overlies at least a portion of the composite structure outer wall 408. The extension 426, however, includes a bifurcation such that the extension 426 includes two or more prongs 436 terminating at respective extension distal ends 466. Each prong of the two or more prongs 436 has a respective cross-sectional area that is any suitable shape such as, but not limited to, triangular, rectangular, ovular, trapezoidal, barbed, or the like. The cross-sectional area of at least two prongs of the two or more prongs 436 can be the same. The cross-sectional of at least two prongs of the two or more prongs 436 can be different. The two or more prongs 436 can be symmetric about the centerline (Cl). The two or more prongs 436 can be asymmetric about the centerline (Cl). The two or more prongs 436 can include any number of a plurality of prongs. The joint 428, as illustrated, is sized such that that the main body 424 is non-continuous with the composite structure outer wall 408. Put another way, a step is formed between the composite structure outer wall 408 and the main body 424. As such, the joint 428 is defined as a stepped joint. As a non-limiting example, an outer surface or outer wall of the cover structure is provided radially outward, with respect to the centerline (Cl), from the outer wall 408 at the main body distal end 464.

Figure 7:
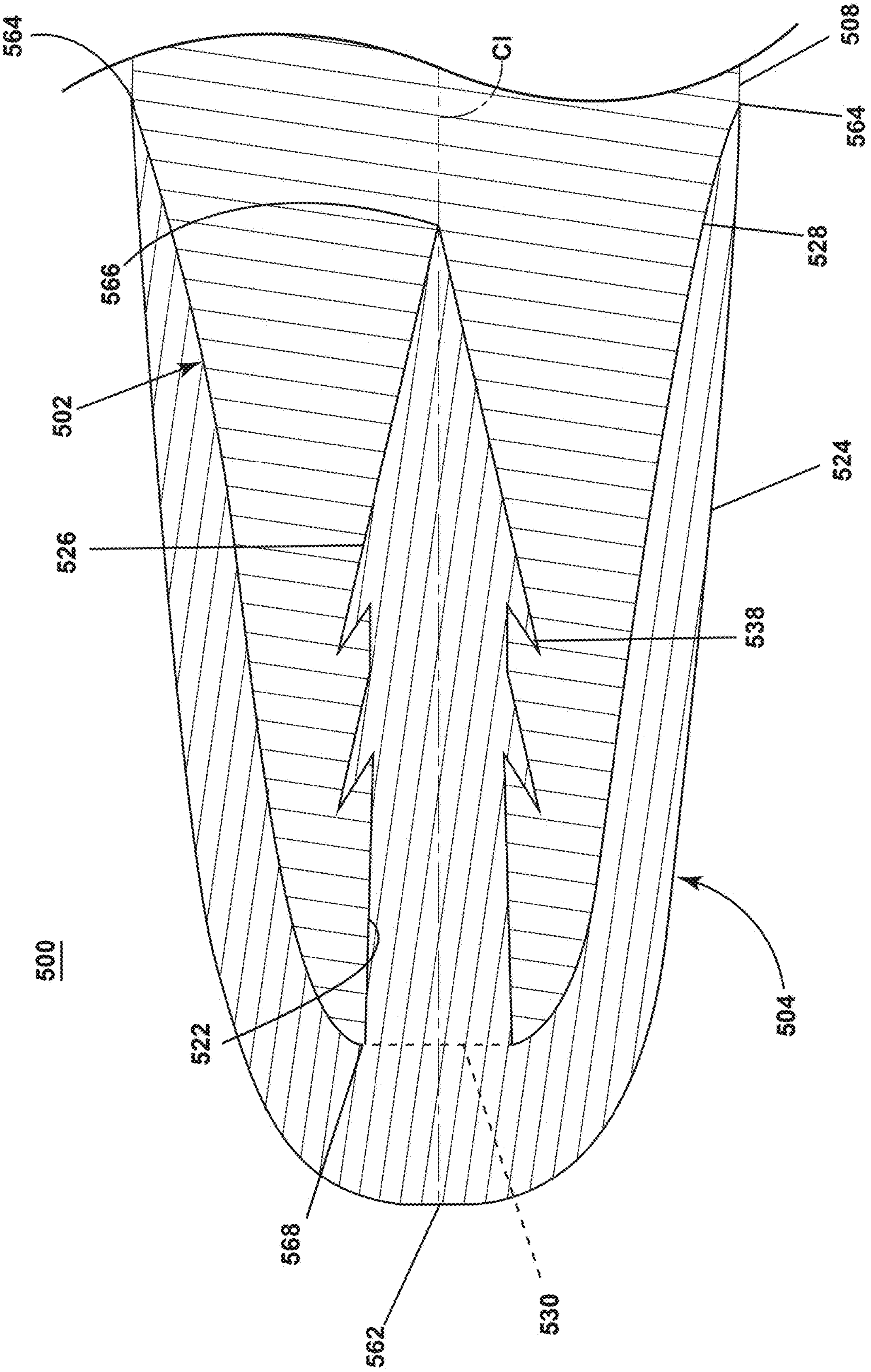
FIG. 7 is a schematic cross-sectional view of an engine component suitable for use with the engine component of FIG. 2, further illustrating an extension having a barbed shape.

FIG. 7 is a schematic cross-sectional view of an engine component 500 suitable for use with the engine component of FIG. 2. The engine component 500 is similar to the engine component 100, 200 (FIG. 4), 300 (FIG. 5), 400 (FIG. 6); therefore, like parts will be identified with like numerals increased to the 500 series with it being understood that the description of the engine component 100, 200, 300, 400 applies to the engine component 500 unless noted otherwise.

The engine component 500 includes a composite structure 502 and a cover structure 504. The engine component 500 includes a centerline (Cl). The composite structure 502 includes a composite structure outer wall 508 and a composite structure edge 568. The composite structure edge 568 can be any suitable edge of the composite structure 502. As a non-limiting example, the composite structure edge 568 can be, but is not limited to, a composite structure tip (e.g., the composite structure tip 112 of FIG. 2), a composite structure root (e.g., the composite structure root 110 of FIG. 2), a composite structure leading edge (e.g., the composite structure leading edge 114 of FIG. 2), a composite structure trailing edge (e.g., the composite structure trailing edge 116 of FIG. 2), or the like. A channel 522 is formed along the composite structure edge 568. The composite structure 502 is any suitable composite structure such as, but not limited to, an airfoil portion (e.g., the airfoil portion 106 of FIG. 2), a fan casing (e.g., the fan casing 40 of FIG. 1), a shroud, or the like. The cover structure 504 includes a main body 524 and an extension 526. The extension 526 meets the main body 524 at a transition 530 illustrated in phantom lines. The cover structure 504 includes a cover structure edge 562, a set of main body distal ends 564, and an extension distal end 566. The cover structure 504 and the composite structure 502 meet at a joint 528.

The engine component 500 is similar to the engine component 100, 200, 300, 400 in that the cover structure 504 is coupled to the composite structure 502. The cover structure 504 is provided along the composite structure edge 568 and overlies at least a portion of the composite structure outer wall 508. The extension 526, however, includes a set of barbs 538 provided along the extension 526. The set of barbs 538 extend into the composite structure 502. It is contemplated that the set of barbs 538 are used to enhance bonding between the cover structure 504 and the composite structure 502. The set of barbs 538 are used to anchor or otherwise secure the cover structure 504 within the channel 522. The set of barbs 538 include any number of one or more barbs. The set of barbs 538 further increase the mating area between the cover structure 504 and the composite structure 502 without increasing the length (e.g., the second centerline length (Cl2) of FIG. 3) of the extension 526. The extension 526 and the set of barbs 538 can be symmetric about the centerline (Cl). The extension 526 and the set of barbs 538 can be asymmetric about the centerline (Cl).

With reference to FIGS. 2-7, it will be appreciated that the cover structure 104, 204, 304, 404, 504 can include any aspect of or combinations of aspects of the cover structure 104, 204, 304, 404, 504. As a non-limiting example, a cover structure can include an extension that has a varying cross-sectional area along the cover structure (e.g., in the spanwise direction (Sd) of FIG. 2) such that the cover structure includes at least two of the rectangular cross-sectional area of the extension 126, the set of alignment channels 232 of the engine component 200, the set of aligners 234 of the engine component 200, the triangular cross-sectional area of the extension 326, the two or more prongs 436 of the extension 426, the set of barbs 538 of the extension 526, or any combination thereof.

Figure 8:
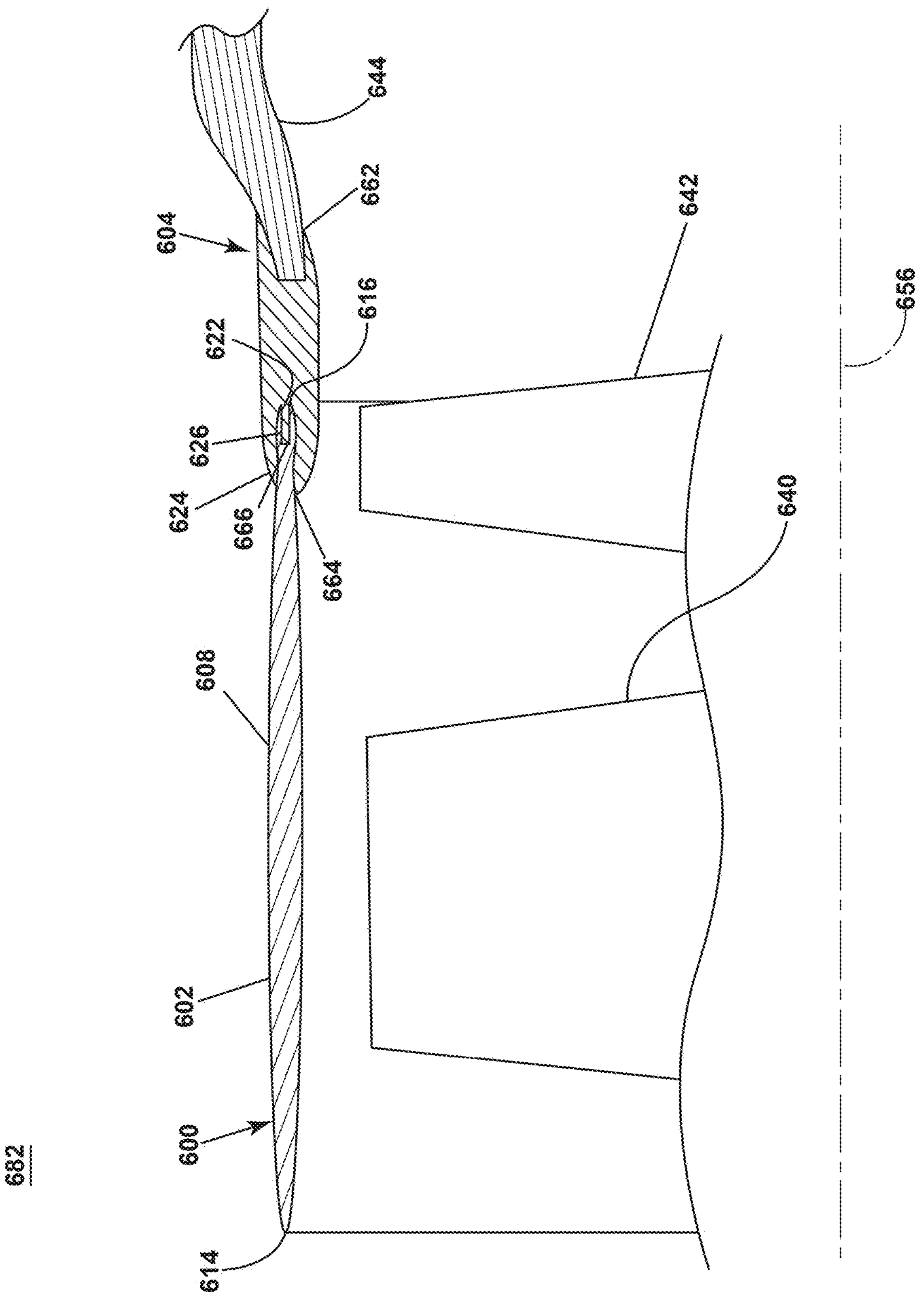
FIG. 8 is a schematic cross-sectional view of an engine component suitable for use with the engine component of FIG. 2, the engine component being a fan casing having a composite structure, the engine component having a cover structure provided along a respective portion of the composite structure.

FIG. 8 is a schematic cross-sectional view of an engine component 600 suitable for use with the engine component 100 of FIG. 2. The engine component 600 is similar to the engine component 100, 200 (FIG. 4), 300 (FIG. 5), 400 (FIG. 6), 500 (FIG. 7); therefore, like parts will be identified with like numerals increased to the 600 series with it being understood that the description of the engine component 100, 200, 300, 400, 500 applies to the engine component 600 unless noted otherwise.

The engine component 600 includes a composite structure 602 and a cover structure 604. The composite structure 602 includes a composite structure outer wall 608 extending between a composite structure leading edge 614 and a composite structure trailing edge 616. The composite structure 602 includes a channel 622. The channel 622 can be formed along the composite structure trailing edge 616. The cover structure 604 includes a main body 624 and an extension 626. The cover structure 604 includes a cover structure edge 662, a set of main body distal ends 664, and an extension distal end 666. The extension 626 is provided within the channel 622.

The engine component 600 is similar to the engine component 100, 200, 300, 400, 500 in that the cover structure 604 is coupled to the composite structure 602. The cover structure 604 is provided along the composite structure edge (e.g., the composite structure trailing edge 616) and overlies at least a portion of the composite structure outer wall 608. However, the cover structure 604, as illustrated, is provided along the composite structure trailing edge 616 rather than the composite structure leading edge 614.

The engine component 600, however, is a casing for a turbine engine 682. The turbine engine 682 has an engine centerline 656, a set of fan blades 640 (e.g., the set of fan blades 42 of FIG. 1) and a set of fan vanes 642 (e.g., the set of airfoil guide vanes 82 of FIG. 1) that are housed within a fan casing (e.g., the fan casing 40 of FIG. 1). The engine component 600, as described herein, is the fan casing. The set of fan blades 640 and the set of fan vanes 642 are similar in function to the set of fan blades 42 (FIG. 1) and the set of airfoil guide vanes 82 (FIG. 1). As a non-limiting example, the turbine engine 682 is a turbofan engine. The turbine engine 682 includes an engine casing 644. The engine casing 644 is any suitable housing separate from the fan casing (e.g., the engine component 600). As a non-limiting example, the engine casing 644 can be the engine casing 46 (FIG. 1), a nacelle, or the like.

The cover structure 604 can extend circumferentially about an entirety of the engine centerline 656. The cover structure 604 can extend circumferentially about less than an entirety of the engine centerline 656. The cover structure 604 can be a single, unitary body. As a non-limiting example, the cover structure 604 can be formed as a continuous annulus that forms a circumferential ring around the engine centerline 656. The cover structure 604 can be multiple, segmented bodies circumferentially spaced about the engine centerline 656.

The cover structure 604 can operably couple the composite structure 602 to the engine casing 644. As a non-limiting example, the cover structure 604 can be integrally formed with or coupled to the engine casing 644 through any suitable method such as, but not limited to, bonding, adhesion, fastening, or the like. As such, the cover structure 604 can define a coupling between the fan casing (e.g., engine component 600) and the engine casing 644.

It is contemplated that mounting the composite structure 602 directly to the engine casing 644 can cause damage to the composite structure 602. As a non-limiting example, during operation of the turbine engine 682, the engine component 600 can move axially, radially or circumferentially with respect to the engine centerline 656. This movement can damage the composite structure 602 if the composite structure 602 is allowed to move freely against or otherwise grind against another structure (e.g., the engine casing 644). The cover structure 604, however, is more resilient to damage due to the movement. As such, providing the cover structure 604 along an edge of the composite structure 602 that would otherwise come into contact with other portions of the turbine engine 682 protects the composite structure 602 from damage. Further, the mounting of the composite structure 602 to the engine casing 644 through the cover structure 604 effectively stabilizes the composite structure 602, thus reducing the movement the engine component 600.

It will be appreciated that the cover structure 604 is provided along any suitable edge of the composite structure 602 such as, but not limited to, the composite structure leading edge 614, the composite structure trailing edge 616, or any other suitable portion of the composite structure outer wall 608. As a non-limiting example, the engine component 600 can include two cover structures 604; one provided along the composite structure leading edge 614 and the other provided along the composite structure trailing edge 616. A cover structure 604 provided along the composite structure leading edge 614 is especially advantageous along a leading edge of a fan casing to protect against incoming debris (e.g., a bird).

Figure 9:
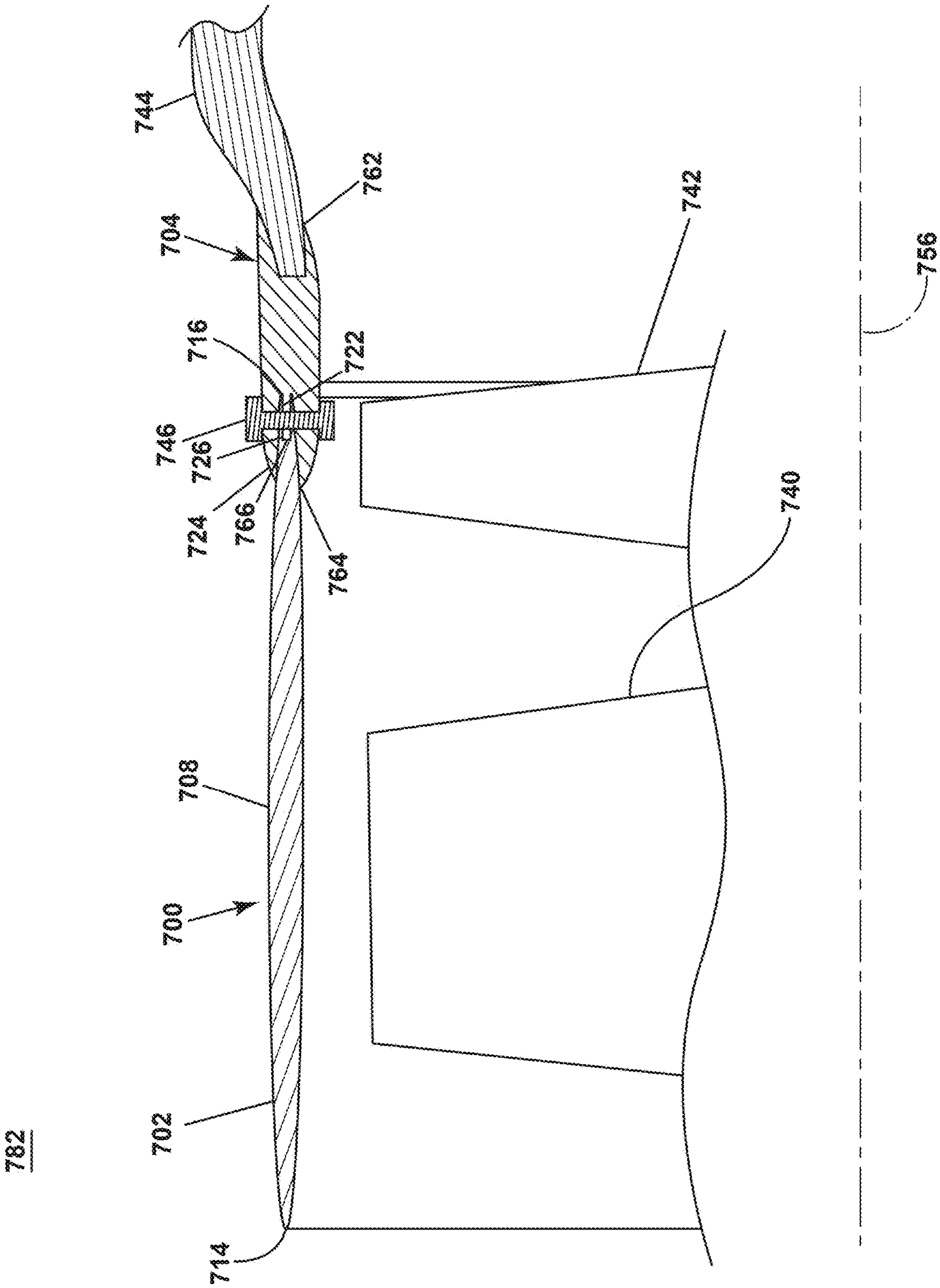
FIG. 9 is a schematic cross-sectional view of an engine component suitable for use with the engine component of FIG. 2, the engine component being a fan casing having a composite structure, the engine component having a cover structure mechanically coupled to the composite structure.

FIG. 9 is a schematic cross-sectional view of an engine component 700 suitable for use with the engine component 700 of FIG. 2. The engine component 700 is similar to the engine component 100, 200 (FIG. 4), 300 (FIG. 5), 400 (FIG. 6), 500 (FIG. 7), 600 (FIG. 8); therefore, like parts will be identified with like numerals increased to the 700 series with it being understood that the description of the engine component 100, 200, 300, 400, 500, 600 applies to the engine component 700 unless noted otherwise.

The engine component 700 includes a composite structure 702 and a cover structure 704. The composite structure 702 includes a composite structure outer wall 708 extending between a composite structure leading edge 714 and a composite structure trailing edge 716. The composite structure 702 includes a channel 722. The channel 722 can be formed along the composite structure trailing edge 716. The cover structure 704 includes a main body 724 and an extension 726. The cover structure 704 includes a cover structure edge 762, a set of main body distal ends 764, and an extension distal end 766. The extension 726 is provided within the channel 722.

The engine component 700 is similar to the engine component 100, 200, 300, 400, 500, 600 in that the cover structure 704 is coupled to the composite structure 702. The cover structure 704 is provided along the composite structure edge (e.g., the composite structure trailing edge 716) and overlies at least a portion of the composite structure outer wall 708.

The engine component 700, like the engine component 600, is provided within a turbine engine 782 having an engine centerline 756, as set of fan blades 740, a set of fan vanes 742, and an engine casing 744. The engine component 700 is a fan casing housing the set of fan blades 740 and the set of fan vanes 742. The cover structure 704 couples the composite structure 702 to the engine casing 744. The cover structure 704, however, is mechanically coupled to the composite structure 702 through use of a fastener 746 in conjunction with the use of the extension 726. The use of the fastener 746 in conjunction with the extension 726 provides additional support between the coupling between the composite structure 702 and the cover structure 704.

The fastener 746 can be formed as a bolt extending through a respective portion of the composite structure 702 and the cover structure 704. The fastener 746 can be formed as a bolt extending through a respective portion of the extension 726.

Figure 10:
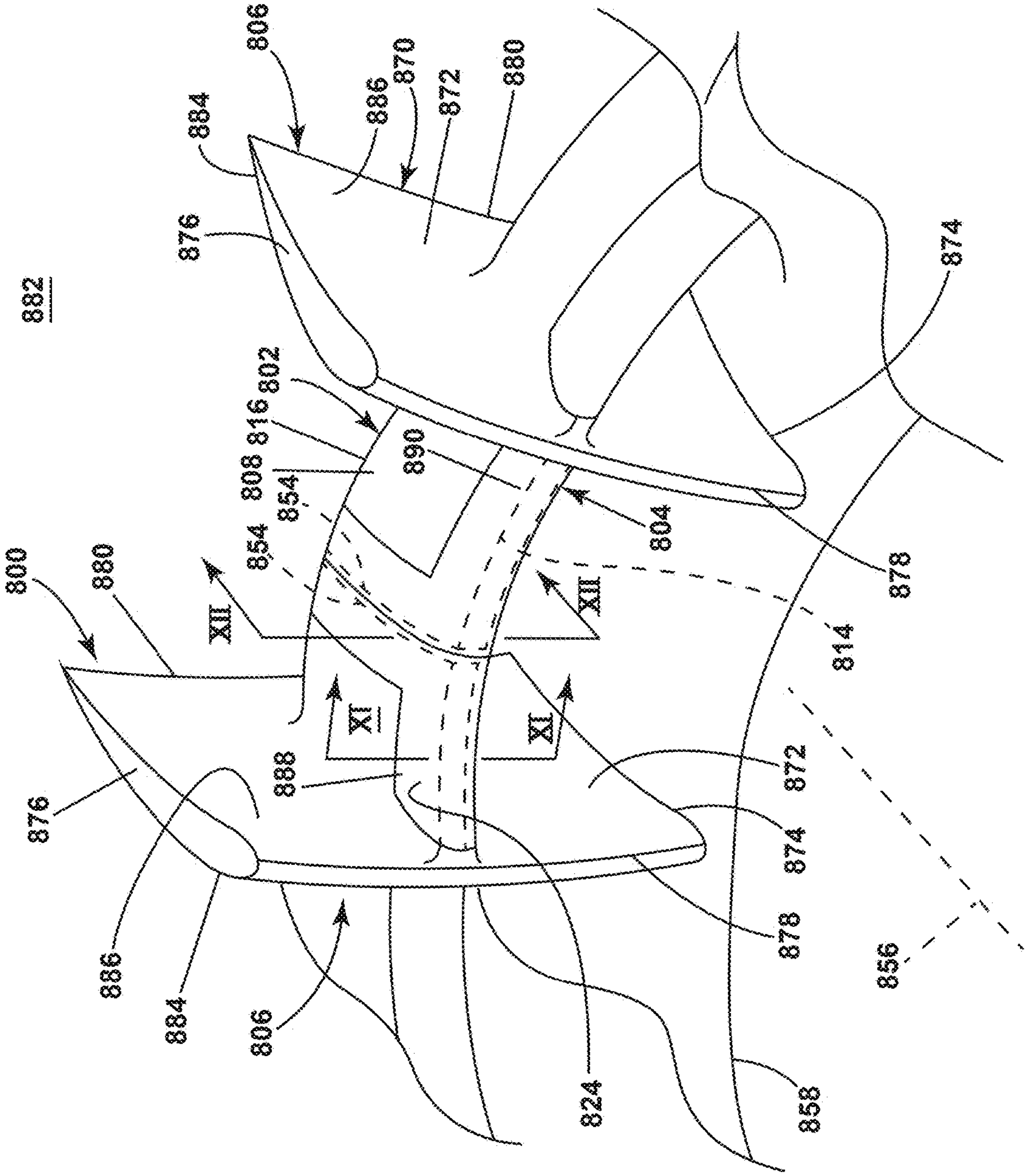
FIG. 10 is a schematic cross-sectional view of an engine component suitable for use with the engine component of FIG. 2, the engine component being an airfoil assembly having a midspan shroud with a composite structure, and a cover structure provided along the composite structure.

FIG. 10 is a schematic view of an engine component 800 suitable for use with the engine component 800 of FIG. 2. The engine component 800 is similar to the engine component 100, 200 (FIG. 4), 300 (FIG. 5), 400 (FIG. 6), 500 (FIG. 7), 600 (FIG. 8), 700 (FIG. 9); therefore, like parts will be identified with like numerals increased to the 800 series with it being understood that the description of the engine component 100, 200, 300, 400, 500, 600, 700 applies to the engine component 800 unless noted otherwise.

The engine component 800 includes a composite structure 802 and a cover structure 804. The composite structure 802 includes a composite structure outer wall 808 extending between a composite structure leading edge 814 and a composite structure trailing edge 816. The cover structure 804 includes a main body 824. The engine component 800 is provided within a turbine engine 882 having an engine centerline 856.

The engine component 800, like the engine component 100, is an airfoil assembly 870. The airfoil assembly 870, however, includes two adjacent airfoil portions 806 circumferentially spaced along a platform 858, with respect to the engine centerline 856. It will be appreciated, however, that the airfoil assembly 870 can include any number of two or more airfoil portions 806. Each airfoil portion of the two adjacent airfoil portions 806 includes an outer wall 872. Each outer wall 872 extends between a root 874 and a tip 876. Each outer wall 872 extends between a leading edge 878 and a trailing edge 880. Each outer wall 872 defines a suction side 884 and a pressure side 886.

The engine component 800 is similar to the engine component 100, 200, 300, 400, 500, 600, 700 in that the cover structure 804 is coupled to the composite structure 802. The cover structure 804 is provided along a composite structure edge and overlies at least a portion of the composite structure outer wall 808. The composite structure 802, however, is a midspan shroud. The midspan shroud (e.g., the composite structure 802) is provided between the root 874 and the tip 876 of the two adjacent airfoil portions 806. The midspan shroud (e.g., the composite structure 802) extends from the suction side 884 of one airfoil portion of the two adjacent airfoil portions 806 to the pressure side 886 of an adjacent airfoil portion of the two adjacent airfoil portions 806. The midspan shroud (e.g., the composite structure 802) extends non-continuously between the two adjacent airfoil portions 806 such that the midspan shroud includes opposing midspan distal ends 854. The opposing midspan distal ends 854 interconnect respective portions of the composite structure leading edge 814 and the composite structure trailing edge 816. It will be appreciated, however, that the midspan shroud (e.g., the composite structure 802) can extend continuously between an entirety of a circumferential extent between the two adjacent airfoil portions 806.

The cover structure 804, as illustrated, includes two bodies provided between the two adjacent airfoil portions 806; a first body 888 and a second body 890. The first body 888 is provided over a first portion of the composite structure 802. The second body 890 is provided over a second portion of the composite structure 802. While the first body 888 and the second body 890 are illustrated as being separate, it will be appreciated that they can be integrally formed or otherwise formed as a unitary body. As a non-limiting example, a single body can extend between the opposing midspan distal ends 854. As a non-limiting example, the midspan shroud (e.g., the composite structure 802) can be continuously formed between the two adjacent airfoil portions 806 and the cover structure 804 can extend continuously, as a single body, along the midspan shroud (e.g., the composite structure 802).

It will be appreciated that one or more airfoil portions of the two adjacent airfoil portions 806, or any other airfoil portion, can define a respective portion of the composite structure 802 or otherwise be a separate composite structure. As such, one or more airfoil portions can include a construction similar to the airfoil portion 106 (FIG. 2) such that the cover structure 804, or a separate cover structure 804 can be coupled to any respective edge of any airfoil portion in conjunction with the cover structure 804 provided along the composite structure 802 defining the midspan shroud.

Figure 11:
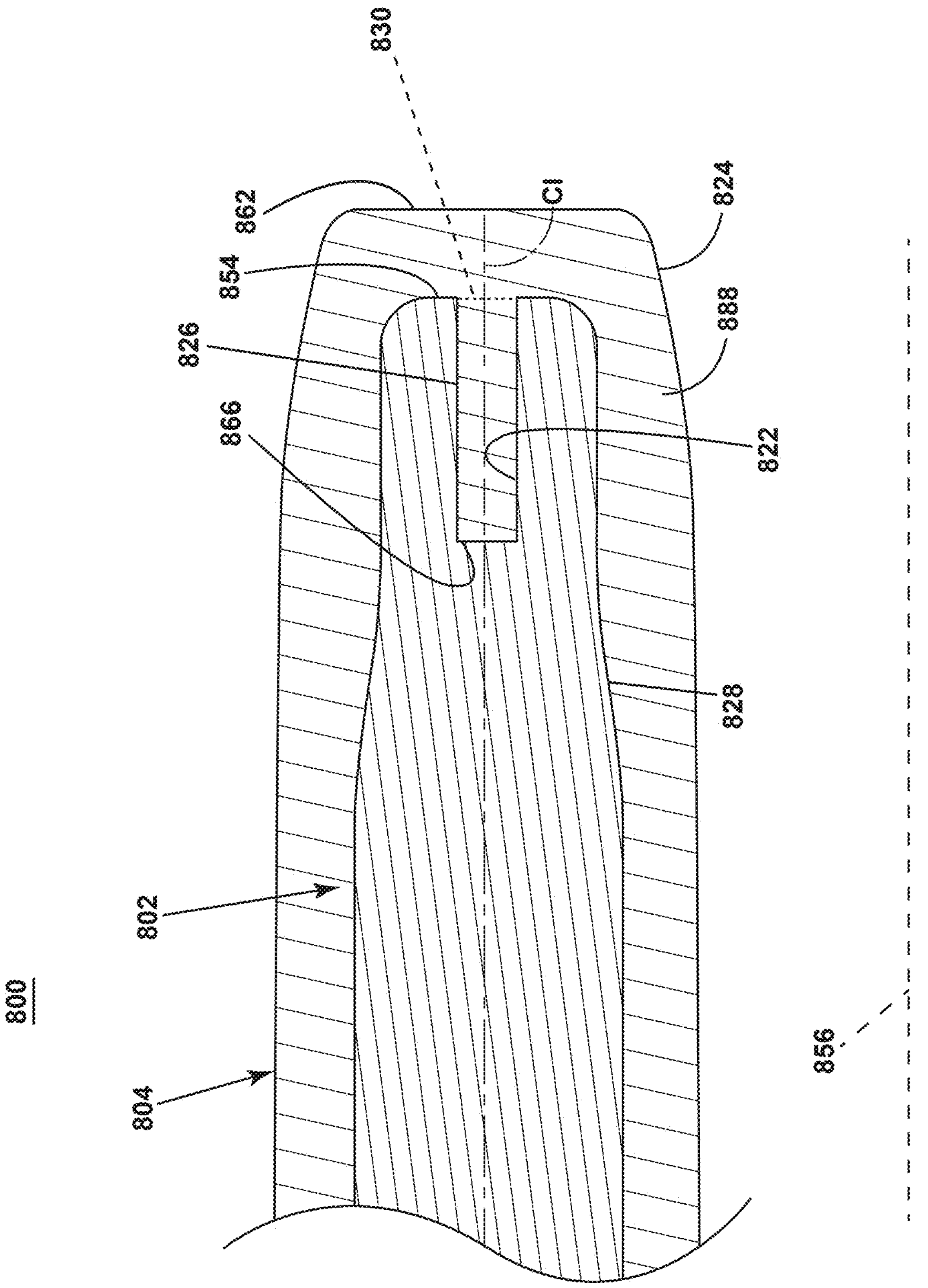
FIG. 11 is a schematic cross-sectional view of the engine component as seen from sectional line XI-XI of FIG. 10, further illustrating an extension of the cover structure.

FIG. 11 is a schematic cross-sectional view of the engine component 800 as seen from sectional line XI-XI of FIG. 10. The cover structure 804 includes an extension 826 and a centerline (Cl). The extension 826 extends from the main body 824 at a transition 830 shown in phantom lines. The extension 826 includes any suitable cross-sectional area. The composite structure includes a channel 822. The channel 822 and the extension 826 are sized such that that extension 826 fits within the channel 822. The cover structure 804 and the composite structure 802 meet at a joint 828.

Figure 12:
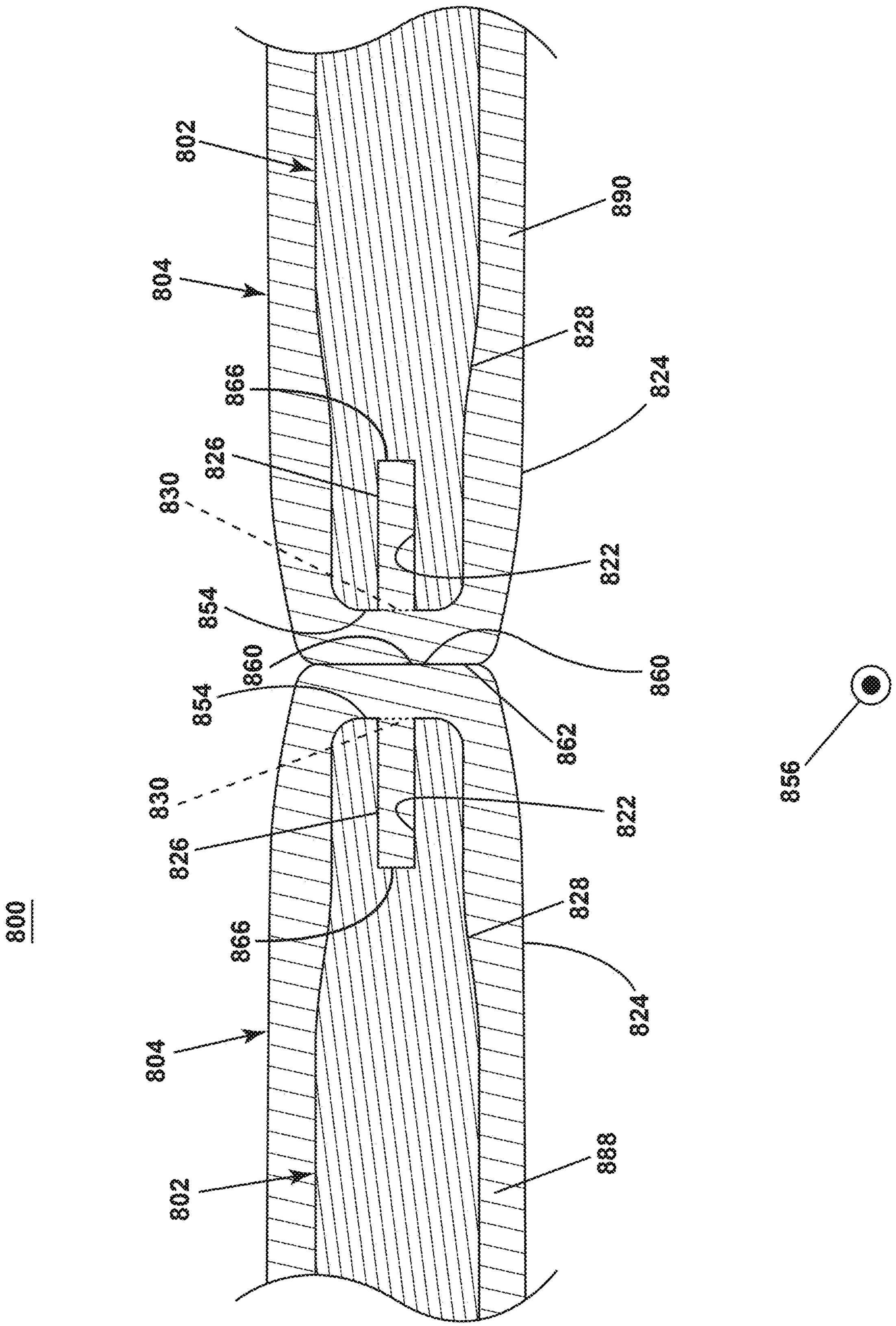
FIG. 12 is a schematic cross-sectional view of the engine component as seen from sectional line XII-XII of FIG. 10, further illustrating an interface between opposing portions of the cover structure.

FIG. 12 is a schematic cross-sectional view of the engine component 800 as seen from sectional line XII-XII of FIG. 10. The first body 888 and the second body 890 meet at an interface 860. While illustrated as the first body 888 and the second body 890, it will be appreciated that the cover structure 804 can include a single body interconnecting the opposing midspan distal ends 854.

The separation of the midspan shroud (e.g., the composite structure 802) and the cover structure 804 between the first body 888 and the second body 890 allows for the engine component 800 to move during operation. This movement of the engine component 800 ensures that stresses due to the engine component 800 being overly rigid if it were not able to move do not occur.

The movement of the engine component 800, however, can cause damage to the engine component 800 if two or more composite sections of the composite structure 802 touch one another and move in opposing directions. As a non-limiting example, if the opposing midspan distal ends 854 were to come into direct contact with each other, grinding would occur between the opposing midspan distal ends 854 and thus damage the opposing midspan distal ends 854. It is contemplated that certain materials (e.g., metallic or plastic materials) are more resistant to grinding than composite materials. As such, the use of the cover structure 804 ensures that the grinding does not damage the engine component 800.

Benefits of the present disclosure include a cover structure having a stronger bond with a respective portion of the engine component that it is coupled to when compared to a conventional engine component having a conventional cover structure. For example, the conventional cover structure is coupled to a respective portion of the conventional engine component through conventional methods such as welding, adhesion, bonding, friction, fastening, or the like.

When relying on fasteners or other external components to couple the conventional cover structure to a remainder of the conventional engine component require additional components to be added to the conventional engine component; thus, increasing the complexity, size, weight and manufacturing burden of the conventional engine component. The increase of the weight of the conventional engine component ultimately reduces the efficiency of the turbine engine. The cover structure, as described herein, uses the extension to effectively couple the cover structure to the composite structure, thus eliminating the need to have complex fastening systems to couple the two together; thus, increasing the overall efficiency of the turbine engine. In some instances, however, a simple fastener (e.g., the fastener 746 of FIG. 9) can be used to supply additional support and stability between the composite structure and the cover structure. In some instances, the set of aligners and the set of alignment channels are used to lock, align and couple the cover structure to the composite structure in conjunction with the extension of the cover structure.

When relying on welding, adhesion, friction, or bonding, a mating area determines the strength of the coupling. The cover structure, as described herein, supports a larger mating area than the conventional cover structure as the cover structure includes the extension, whereas the conventional cover structure does not include the extension. As such, the cover structure has a stronger bond to the composite structure when compared to the conventional cover structure.

The stronger bond between the cover structure and the composite structure further ensures that the engine component has a better resiliency to forces (e.g., operational forces, external forces, etc.) when compared to the conventional engine component. When a force is applied to the conventional engine component, the cover structure can become dislodged, get damaged, or otherwise not absorb the force as intended if the conventional cover structure is not adequately coupled to the respective portion of the conventional engine component. Ensuring adequate coupling can be achieved through use of the fasteners, however, as described previously this increases the complexity, weight and manufacturing burden of the conventional engine component. When using other coupling methods (e.g., welding, adhesion, friction, bonding, or the like), the ability for the cover structure to withstand higher forces is dependent on well the cover structure is mated to the respective portion of the engine component. As described previously, the cover structure has a larger mating area than the conventional cover structure. As such, the cover structure, as described herein, has a higher resilience to forces when welding, adhesion, friction, or bonding is used as the coupling method.

To the extent not already described, the different features and structures of the various embodiments can be used in combination, or in substitution with each other as desired. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

An engine component for a turbine engine, the engine component comprising a composite structure having a composite structure outer wall, a composite structure edge, and a channel provided along the composite structure edge, and a cover structure encasing at least a portion of the composite structure outer wall, the cover structure including a main body and an extension, the main body extending along the at least a portion of the composite structure outer wall of the composite structure, the extension received within the channel.

The engine component of any preceding clause, wherein the cover structure includes a non-constant cross-sectional area along the composite structure edge when viewed along a plane that is locally perpendicular to the composite structure edge and intersecting the cover structure.

The engine component of any preceding clause, wherein the cover structure extends axially along an entirety of the composite structure edge.

The engine component of any preceding clause, wherein the composite structure includes an airfoil portion having an outer wall defining the composite structure outer wall.

The engine component of any preceding clause, wherein the outer wall extends between a composite structure root and a composite structure tip, and between a composite structure leading edge and a composite structure trailing edge, with the composite structure edge being at least one of the composite structure tip, the composite structure leading edge, or the composite structure trailing edge.

The engine component of any preceding clause, wherein composite structure edge is the composite structure leading edge.

The engine component of any preceding clause, wherein the engine component is an airfoil assembly having an airfoil portion extending between a root and a tip, and a midspan shroud extending from the airfoil assembly, the midspan shroud being the composite structure.

The engine component of any preceding clause, wherein the composite structure overlies at least a portion of a composite structure leading edge.

The engine component of any preceding clause, wherein the composite structure outer wall extends between a composite structure leading edge and a composite structure trailing edge, the midspan shroud includes a midspan distal end interconnecting the composite structure trailing edge and the composite structure leading edge, with the cover structure overlying at least a portion of the midspan distal end.

The engine component of any preceding clause, wherein the turbine engine has an engine centerline, the airfoil assembly includes two adjacent airfoil portions circumferentially spaced with respect to the engine centerline, and the midspan shroud extends non-continuously between the composite structure to define circumferentially opposing midspan distal ends, and the cover structure is provided along the opposing midspan distal ends.

The engine component of any preceding clause, wherein the turbine engine comprises a fan section, and the composite structure is a fan casing of the fan section.

The engine component of any preceding clause, wherein the cover structure is provided along a composite structure trailing edge.

The engine component of any preceding clause, wherein the turbine engine includes an engine casing, and wherein the cover structure operably couples the fan casing to the engine casing.

The engine component of any preceding clause, wherein the composite structure comprises an alignment channel provided along the composite structure outer wall, and the cover structure comprises an aligner provided along the main body, the aligner being received within the alignment channel.

The engine component of any preceding clause, wherein, the composite structure includes a centerline extending from the composite structure edge, the main body extends a first centerline length axially with respect to the centerline, and the extension extends a second centerline length axially with respect to the centerline, the second centerline length being greater than or equal to 10% and less than or equal to 100% of the first centerline length.

The engine component of any preceding clause, wherein the extension includes a set of barbs extending into the composite structure.

The engine component of any preceding clause, wherein the extension includes a triangular shape when viewed along a plane locally perpendicular to the composite structure edge and intersecting the extension.

The engine component of any preceding clause, wherein at least a portion of the extension is bifurcated.

The engine component of any preceding clause, wherein the extension includes a rectangular shape when viewed along a plane locally perpendicular to the composite structure edge and intersecting the extension.

The engine component of any preceding clause, wherein the cover structure includes at least one of a metallic material or a plastic material.

The engine component of any preceding clause, wherein the cover structure includes at least one of titanium, aluminum, or polyurethane.

The engine component of any preceding clause, wherein the composite structure includes a composite material including at least one of a polymer matrix composite, a ceramic matrix composite, a metal matrix composite, carbon fiber, polymeric resin, a thermoplastic, a bismaleimide, a polyimide, an epoxy resin, a glass fiber, or a silicon matrix.

The engine component of any preceding clause, further comprising a fastener operatively coupling the cover structure to the composite structure.

The engine component of any preceding clause, wherein the fastener extends through a respective portion of the composite structure and the cover structure.

The engine component of any preceding clause, wherein the fastener extends through a respective portion of the extension.

The engine component of any preceding clause, wherein the cover structure extends continuously from the composite structure outer wall when the cover structure is coupled to the composite structure.

The engine component of any preceding clause, wherein an outer surface of the cover structure is flush against the outer wall with respect to the outer wall at a main body distal end.

The engine component of any preceding clause, wherein an outer surface of the cover structure is recessed with respect to the outer wall at a main body distal end.

The engine component of any preceding clause, wherein the outer surface of the cover structure is provided radially outward with respect to the outer wall at a main body distal end to form a stepped joint.

The engine component of any preceding clause, wherein the cover structure is pre-cured or co-molded with the composite structure.

The engine component of any preceding clause, wherein a joint is formed between the cover structure and the composite structure, the joint being at least one of a butt joint, a lap joint, a scarf joint or a stepped joint.

A turbine engine comprising an engine core having a compressor section, a combustion section, and a turbine section in serial flow arrangement, the engine core defining a rotor and a stator, an engine casing encasing at least a portion of the engine core, a fan section coupled to the rotor, the fan section including a fan casing, the fan casing including a composite structure having an outer wall, a composite structure edge, and a channel provided along the composite structure edge, and a cover structure encasing at least a portion of the outer wall, the cover structure coupling the fan casing to the engine casing.

The turbine engine of any preceding clause, wherein the cover structure includes a non-constant cross-sectional area along the composite structure edge when viewed along a plane that is locally perpendicular to the composite structure edge and intersecting the cover structure.

The turbine engine of any preceding clause, wherein the cover structure extends axially along an entirety of the composite structure edge.

The turbine engine of any preceding clause, wherein the composite structure includes an airfoil portion having an outer wall defining the composite structure outer wall.

The turbine engine of any preceding clause, wherein the outer wall extends between a composite structure root and a composite structure tip, and between a composite structure leading edge and a composite structure trailing edge, with the composite structure edge being at least one of the composite structure tip, the composite structure leading edge, or the composite structure trailing edge.

The turbine engine of any preceding clause, wherein composite structure edge is the composite structure leading edge.

The turbine engine of any preceding clause, wherein the engine component is an airfoil assembly having an airfoil portion extending between a root and a tip, and a midspan shroud extending from the airfoil assembly, the midspan shroud being the composite structure.

The turbine engine of any preceding clause, wherein the composite structure overlies at least a portion of a composite structure leading edge.

The turbine engine of any preceding clause, wherein the composite structure outer wall extends between a composite structure leading edge and a composite structure trailing edge, the midspan shroud includes a midspan distal end interconnecting the composite structure trailing edge and the composite structure leading edge, with the cover structure overlying at least a portion of the midspan distal end.

The turbine engine of any preceding clause, wherein the turbine engine has an engine centerline, the airfoil assembly includes two adjacent airfoil portions circumferentially spaced with respect to the engine centerline, and the midspan shroud extends non-continuously between the composite structure to define circumferentially opposing midspan distal ends, and the cover structure is provided along the opposing midspan distal ends.

The turbine engine of any preceding clause, wherein the turbine engine comprises a fan section, and the composite structure is a fan casing of the fan section.

The turbine engine of any preceding clause, wherein the cover structure is provided along a composite structure trailing edge.

The turbine engine of any preceding clause, wherein the turbine engine includes an engine casing, and wherein the cover structure operably couples the fan casing to the engine casing.

The turbine engine of any preceding clause, wherein the composite structure comprises an alignment channel provided along the composite structure outer wall, and the cover structure comprises an aligner provided along the main body, the aligner being received within the alignment channel.

The turbine engine of any preceding clause, wherein, the composite structure includes a centerline extending from the composite structure edge, the main body extends a first centerline length axially with respect to the centerline, and the extension extends a second centerline length axially with respect to the centerline, the second centerline length being greater than or equal to 10% and less than or equal to 100% of the first centerline length.

The turbine engine of any preceding clause, wherein the extension includes a set of barbs extending into the composite structure.

The turbine engine of any preceding clause, wherein the extension includes a triangular shape when viewed along a plane locally perpendicular to the composite structure edge and intersecting the extension.

The turbine engine of any preceding clause, wherein at least a portion of the extension is bifurcated.

The turbine engine of any preceding clause, wherein the extension includes a rectangular shape when viewed along a plane locally perpendicular to the composite structure edge and intersecting the extension.

The turbine engine of any preceding clause, wherein the cover structure includes at least one of a metallic material or a plastic material.

The turbine engine of any preceding clause, wherein the cover structure includes at least one of titanium, aluminum, or polyurethane.

The turbine engine of any preceding clause, wherein the composite structure includes a composite material including at least one of a polymer matrix composite, a ceramic matrix composite, a metal matrix composite, carbon fiber, polymeric resin, a thermoplastic, a bismaleimide, a polyimide, an epoxy resin, a glass fiber, or a silicon matrix.

The turbine engine of any preceding clause, wherein the engine component further comprises a fastener operatively coupling the cover structure to the composite structure.

The turbine engine of any preceding clause, wherein the fastener extends through a respective portion of the composite structure and the cover structure.

The turbine engine of any preceding clause, wherein the fastener extends through a respective portion of the extension.

The turbine engine of any preceding clause, wherein the cover structure extends continuously from the composite structure outer wall when the cover structure is coupled to the composite structure.

The turbine engine of any preceding clause, wherein an outer surface of the cover structure is flush against the outer wall with respect to the outer wall at a main body distal end.

The turbine engine of any preceding clause, wherein an outer surface of the cover structure is recessed with respect to the outer wall at a main body distal end.

The turbine engine of any preceding clause, wherein the outer surface of the cover structure is provided radially outward with respect to the outer wall at a main body distal end to form a stepped joint.

The turbine engine of any preceding clause, wherein the cover structure is pre-cured or co-molded with the composite structure.

The turbine engine of any preceding clause, wherein a joint is formed between the cover structure and the composite structure, the joint being at least one of a butt joint, a lap joint, a scarf joint or a stepped joint.

What is claimed is:

1. An engine component for a turbine engine, the engine component comprising:

a composite structure having a composite structure outer wall, a composite structure edge, and a channel provided along the composite structure edge, the composite structure having a centerline extending from the composite structure edge; and a cover structure encasing at least a portion of the composite structure outer wall, the cover structure including a main body and an extension, the main body extending along at least a portion of the composite structure outer wall that is axially spaced from the composite structure edge, with respect to the centerline, the extension received within the channel;

wherein at least a portion of the composite structure is located radially between opposite sides of the extension and the main body, with respect to the centerline.

2. The engine component of claim 1, wherein the main body extends along at least a portion of the composite structure outer wall that is axially spaced aft of the composite structure edge.

3. The engine component of claim 1, wherein the main body extends along at least a portion of the composite structure outer wall that is axially spaced forward of the composite structure edge.

4. The engine component of claim 3, wherein the turbine engine comprises a fan section, and the composite structure is a fan casing of the fan section.

5. The engine component of claim 4, wherein the turbine engine includes an engine casing, and wherein the cover structure couples the fan casing to the engine casing.

6. The engine component of claim 1, wherein:

the composite structure includes an airfoil portion having an outer wall defining the composite structure outer wall; and the composite structure outer wall extends between a composite structure root and a composite structure tip, and between a composite structure leading edge and a composite structure trailing edge, with the composite structure edge being at least one of the composite structure tip, the composite structure leading edge, or the composite structure trailing edge.

7. The engine component of claim 1, wherein the engine component is an airfoil assembly having an airfoil portion extending between a root and a tip, and a midspan shroud extending from the airfoil assembly, the midspan shroud being the composite structure.

8. The engine component of claim 7, wherein the composite structure outer wall extends between a composite structure leading edge and a composite structure trailing edge, the midspan shroud includes a midspan distal end interconnecting the composite structure trailing edge and the composite structure leading edge, with the cover structure overlying at least a portion of the midspan distal end.

9. The engine component of claim 7, wherein:

the turbine engine has an engine centerline;

the airfoil assembly includes two adjacent airfoil portions circumferentially spaced with respect to the engine centerline;

the midspan shroud extends non-continuously between the two adjacent airfoil portions to define circumferentially opposing midspan distal ends; and the cover structure is provided along the circumferentially opposing midspan distal ends.

10. The engine component of claim 1, wherein the composite structure comprises an alignment channel provided along the composite structure outer wall, and the cover structure comprises an aligner provided along the main body, the aligner being received within the alignment channel.

11. The engine component of claim 1, wherein:

the main body extends a first centerline length axially with respect to the centerline; and the extension extends a second centerline length axially with respect to the centerline, the second centerline length being greater than or equal to 10% and less than or equal to 100% of the first centerline length.

12. The engine component of claim 1, wherein the extension includes a set of barbs extending into the composite structure.

13. The engine component of claim 1, wherein the extension includes a triangular shape when viewed along a plane locally perpendicular to the composite structure edge and intersecting the extension.

14. The engine component of claim 1, wherein at least a portion of the extension is bifurcated.

15. The engine component of claim 1, wherein the extension includes a rectangular shape when viewed along a plane locally perpendicular to the composite structure edge and intersecting the extension.

16. The engine component of claim 1, wherein the cover structure includes at least one of a metallic material or a plastic material.

17. An engine component for a turbine engine, the engine component comprising:

a composite structure having a composite structure outer wall, a composite structure edge, and a channel provided along the composite structure edge, the composite structure having a centerline extending from the composite structure edge; and a cover structure encasing at least a portion of the composite structure outer wall, the cover structure including a main body and an extension, the main body extending along at least a portion of the composite structure outer wall that is axially spaced from the composite structure edge, with respect to the centerline, the extension received within the channel;

wherein:

the main body and the extension are integrally formed;

the channel extends into the composite structure in a first direction, with respect to the centerline; and the extension has a cross-sectional area when viewed along a plane extending along the centerline and intersecting the cover structure, the cross-sectional area of the extension being non-constant in a second direction, transverse the first direction, within the channel.

18. An engine component for a turbine engine, the engine component comprising:

a composite structure having a composite structure outer wall, a composite structure edge, and a channel provided along the composite structure edge, the composite structure having a centerline extending from the composite structure edge; and a cover structure encasing at least a portion of the composite structure outer wall, the cover structure including a main body and an extension, the main body extending along at least a portion of the composite structure outer wall, the extension received within the channel;

wherein:

the main body terminates at a main body distal end that is spaced a first centerline length axially from the composite structure edge in an axial direction, with respect to the centerline; and the extension terminates at an extension distal end that is spaced a second centerline length axially from the composite structure edge in the axial direction, with respect to the centerline, the second centerline length being less than or equal to the first centerline length.

19. The engine component of claim 18, wherein the main body extends along at least a portion of the composite structure outer wall that is axially spaced aft of the composite structure edge.

20. The engine component of claim 18, wherein the engine component is one of an airfoil or a fan casing.

* * * * *